United States Patent [19]
Lancaster et al.

[11] Patent Number: 5,897,089
[45] Date of Patent: Apr. 27, 1999

[54] CONTAINER HOLDER

[76] Inventors: Kelly A. Lancaster, Wyoming; Bruno Conte, Kentwood; Gregory M. Ejsmont, Grand Rapids; Paul C. Schutter, Kent City, all of Mich.

[21] Appl. No.: 08/757,450

[22] Filed: Nov. 27, 1996

Related U.S. Application Data

[63] Continuation-in-part of application No. 08/179,988, Jan. 11, 1994, Pat. No. 5,527,008
[60] Provisional application No. 60/007,874, Dec. 1, 1995.

[51] Int. Cl.$^6$ .................................................. A47K 1/08
[52] U.S. Cl. ..................... 248/311.2; 74/110; 74/577 SF; 224/926; 248/286.1; 297/188.17
[58] Field of Search ................................ 248/311.2, 313, 248/286.1, 289.11; 297/188.14, 188.15, 188.16, 188.17, 188.19; 224/926; 74/110, 577 SF

[56] References Cited

U.S. PATENT DOCUMENTS

| | | |
|---|---|---|
| 4,511,072 | 4/1985 | Owens . |
| 4,783,037 | 11/1988 | Flowerday . |
| 4,828,211 | 5/1989 | McConnell et al. . |
| 4,892,281 | 1/1990 | DiFilippo et al. . |
| 4,943,111 | 7/1990 | VanderLaan . |
| 4,953,771 | 9/1990 | Fischer et al. . |
| 4,981,277 | 1/1991 | Elwell . |
| 5,007,610 | 4/1991 | Christiansen et al. . |
| 5,024,411 | 6/1991 | Elwell . |
| 5,072,989 | 12/1991 | Spykerman et al. . |
| 5,087,008 | 2/1992 | Miller et al. . |
| 5,096,152 | 3/1992 | Christiansen et al. . |
| 5,104,184 | 4/1992 | Kwasnik et al. . |
| 5,104,185 | 4/1992 | Christiansen et al. ........... 248/311.2 X |
| 5,131,716 | 7/1992 | Kwasnik et al. . |
| 5,171,061 | 12/1992 | Marcusen . |
| 5,190,259 | 3/1993 | Okazaki . |
| 5,219,140 | 6/1993 | Spykerman . |
| 5,259,580 | 11/1993 | Anderson et al. . |
| 5,284,314 | 2/1994 | Misaras et al. . |
| 5,289,962 | 3/1994 | Tull et al. . |
| 5,318,343 | 6/1994 | Spykerman et al. . |
| 5,330,146 | 7/1994 | Spykerman . |
| 5,427,447 | 6/1995 | Satoh ............................. 297/188.17 X |
| 5,489,054 | 2/1996 | Schiff ............................... 248/311.2 X |
| 5,524,958 | 6/1996 | Wieczorek et al. . |
| 5,527,008 | 6/1996 | Schutter et al. . |
| 5,671,877 | 9/1997 | Yabuya ............................ 248/311.2 X |
| 5,692,658 | 12/1997 | Fischer et al. ................... 248/311.2 X |

Primary Examiner—Derek J. Berger

[57] ABSTRACT

A container holder adapted to be mounted within a vehicle interior compartment is provided comprising a housing which mounts at least one pivotable arm which defines a container-receiving area. The arm is pivotable by a user between a retracted and an extended position to vary the usable size of the container-receiving area. After a beverage container is placed within the housing, a user can pivot the arm into contact with an outer surface of the beverage container so that the beverage container is securely retained during operation of the vehicle. The beverage container is thereby retained in the housing in a stable manner. A release assembly is also provided which returns the arm to the retracted position when the beverage container is removed.

12 Claims, 10 Drawing Sheets

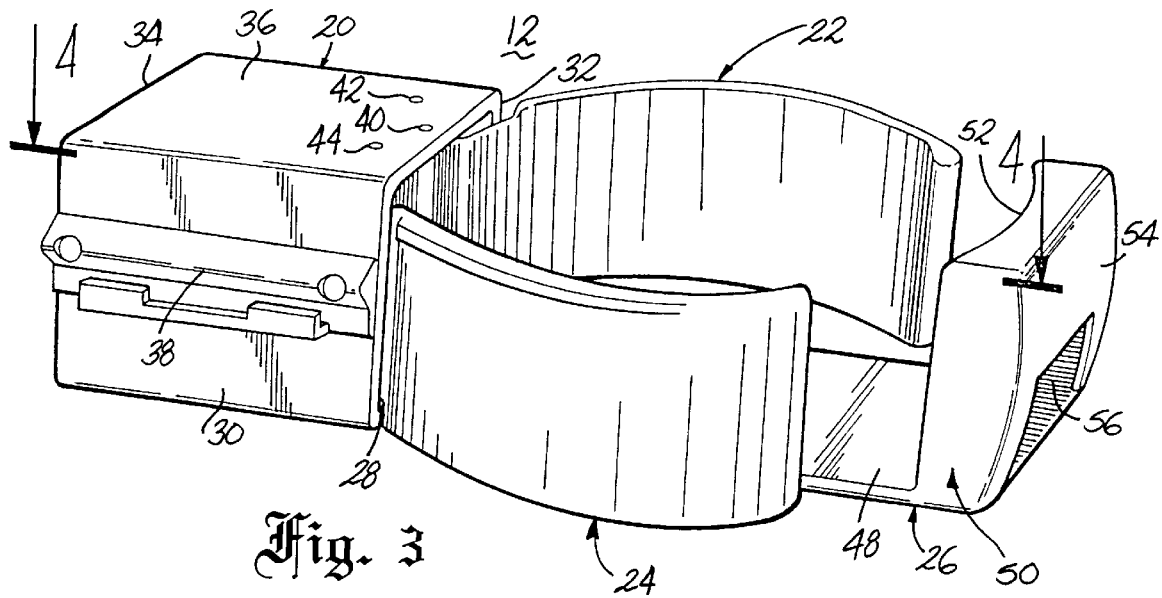
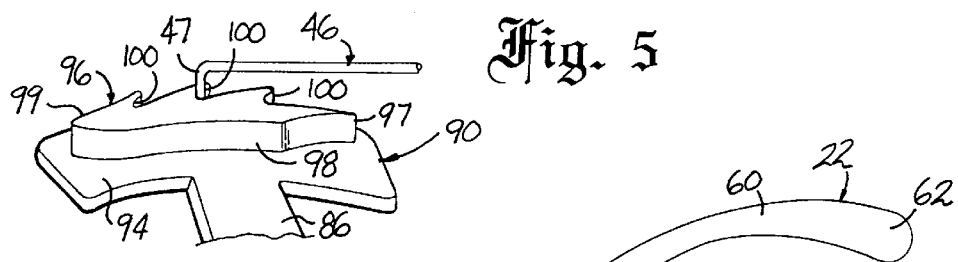
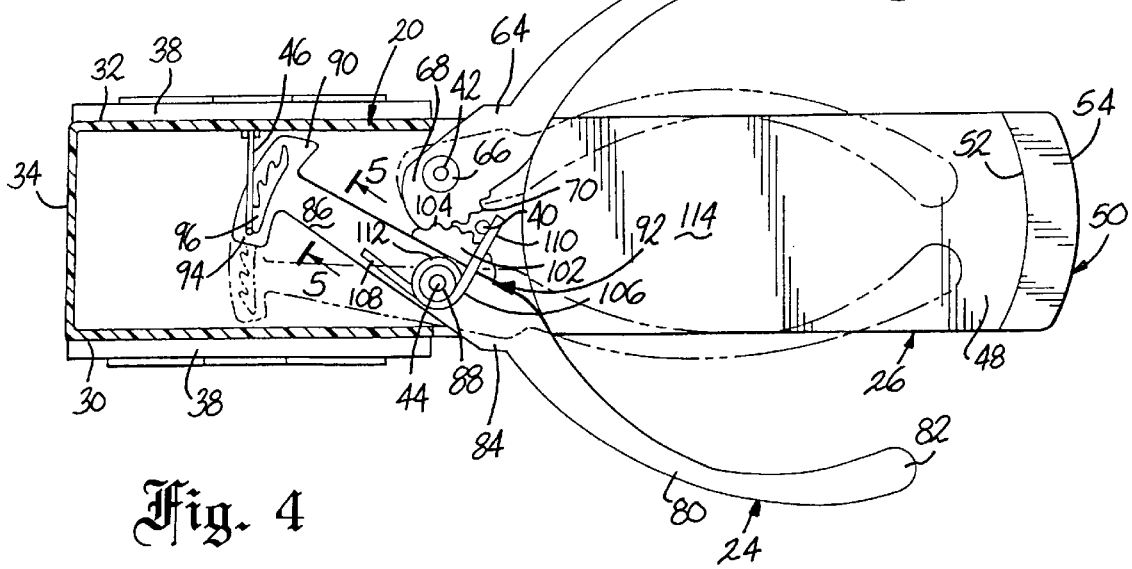

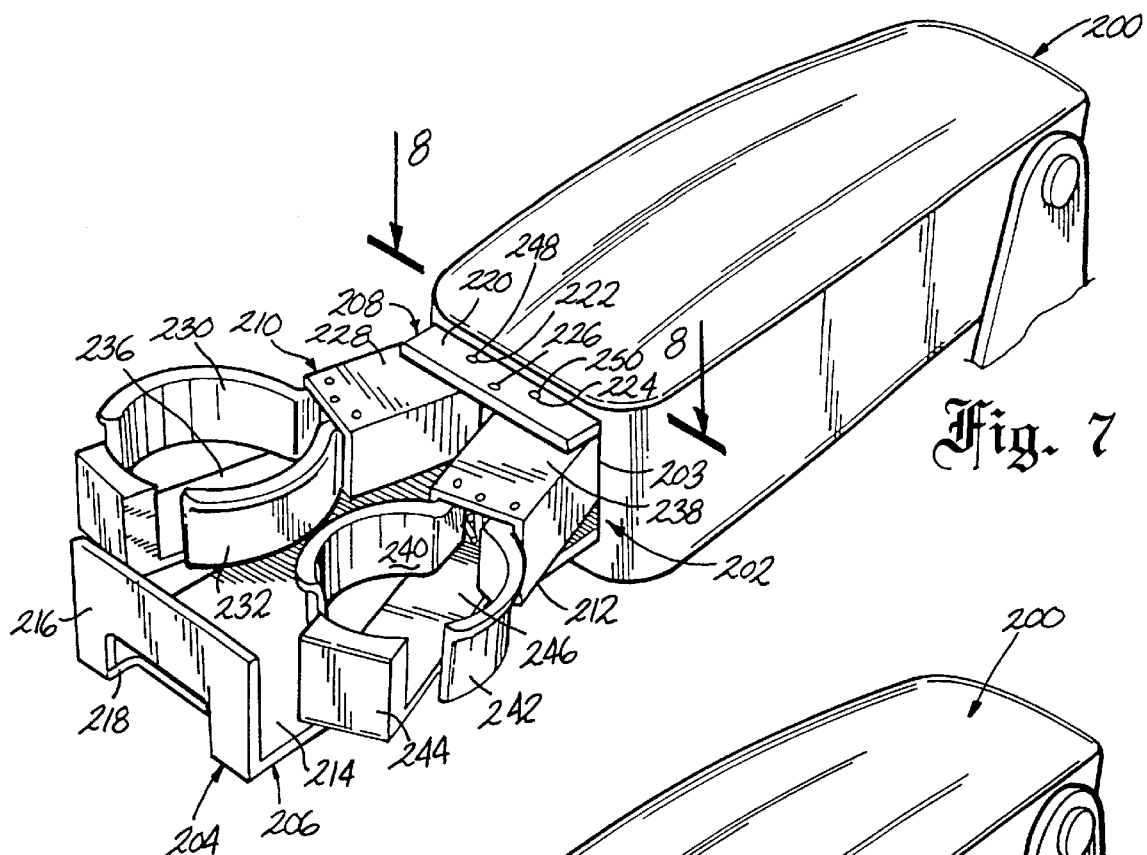
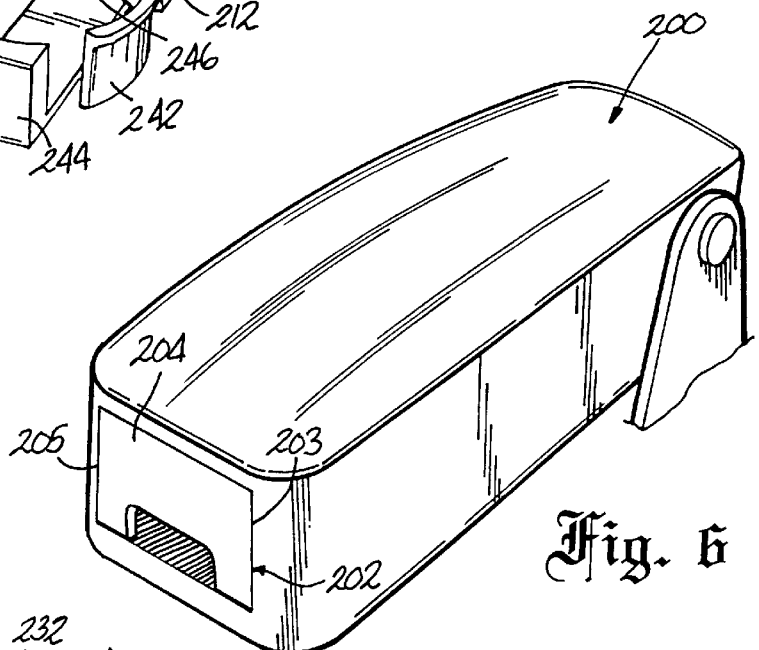
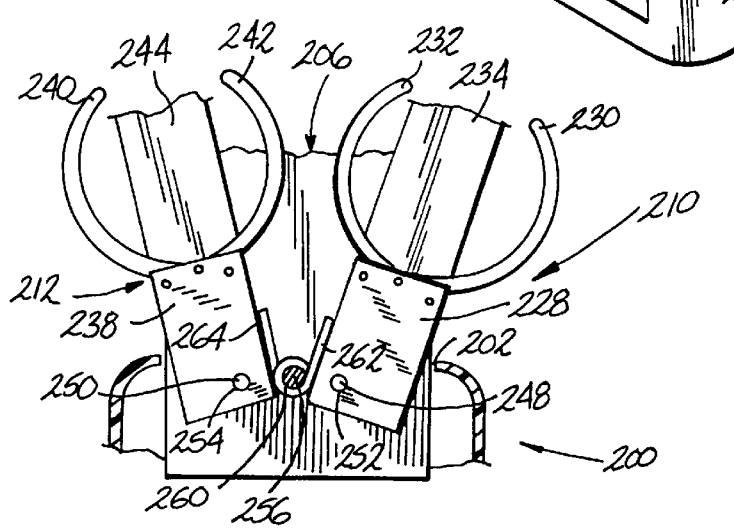
Fig. 7
Fig. 6
Fig. 8

CONTAINER HOLDER

CLAIM OF PRIORITY

The application claims priority pursuant to 35 U.S.C. § 119 of U.S. provisional patent application Serial No. 60/007,874, filed Dec. 1, 1995.

CROSS-REFERENCE TO RELATED APPLICATIONS

The application is a continuation-in-part of U.S. Ser. No. 08/179,988, filed Jan. 11, 1994, now U.S. Pat. No. 5,527,008.

BACKGROUND OF THE INVENTION

1. Field of the Invention

This invention relates to a container holder, and more specifically to an adjustable container holder for receiving containers of varying sizes.

2. Description of Related Art

Container holders in an automobile are commonplace in contemporary vehicles. The container holders are used to store a beverage container so that the vehicle operator can operate the vehicle without concern over the spilling of the container. Consequently, a number of devices have been developed for retaining and supporting beverage containers used in automobiles.

Several prior patents disclose trays which may be slidably mounted below an automobile dashboard for movement between a retracted storage position below the dashboard and an extended position of use above or close to the leading edge of the front passenger seat. Such trays may be provided with fixed circular apertures for receiving beverage containers. Examples of these devices are disclosed in U.S. Pat. No. 2,825,611, issued Mar. 4, 1958, U.S. Pat. No. 3,606,112, issued Sep. 20, 1971, and U.S. Pat. No. 3,899,982, issued Aug. 19, 1975.

Other references disclose trays which may be swingably mounted below an automobile dashboard for movement between a storage position below the dashboard and position of use extending from the dashboard toward the seat. These trays also may be provided with fixed circular apertures for receiving beverage containers. Examples of the latter devices are disclosed in U.S. Pat. No. 3,772,934, issued Dec. 4, 1956, and U.S. Pat. No. 3,190,241, issued Jun. 22, 1965.

These prior art devices which provide specific means for supporting and retaining beverage containers disclose trays having complete and fixed circular apertures arranged in a side-by-side or front-to-back relation. This necessarily requires that the width or depth, respectively, of the tray be greater than the diameter of two beverage containers to allow enough area to enclose a pair of fixed, complete circular apertures. Such devices obviously occupy considerable space below the vehicle dashboard.

More recent container holders disclose a drawer or tray slidably mounted within the dashboard or console of the vehicle. The drawer or tray has semicircular openings forming a portion of a cup receiving area and arcuate arms completing the cup receiving area. Many of these container holders disclose arms which are biased inwardly toward the drawer and which can be moved outwardly from an initial minimum position to an enlarged position to receive a cup of larger diameter than the cup receiving area. Examples of these cup holders are U.S. Pat. No. 5,259,580, issued Nov. 9, 1993 and U.S. Pat. No. 4,953,771, issued Sep. 4, 1990.

Similarly, other cup holders have a cup receiving area formed by a body portion having semicircular openings and an arm which is biased to a closed or retracted position. These cup holders are expandable from a minimum size to a larger size by forcing the cup into the cup receiving area and moving the arm opposite the direction that it is biased. See U.S. Pat. No. 5,131,716, issued Jul. 21, 1992, U.S. Pat. No. 5,104,184, issued Apr. 14, 1992, and U.S. Pat. No. 5,190,259, issued Mar. 2, 1993. However, these cup holders are difficult and unsafe to use because they often require the use of both hands when the cup is larger than the minimum cup holder size. One hand is used to expand the cup holder and the other hand is used to place the cup in the expanded cup holder.

SUMMARY OF THE INVENTION

The invention improves the art of adjustable cup holders by providing a container holder having variable size container holders that can be easily adjusted with one hand between multiple discrete positions and remain fixed in the desired position. Thus, the vehicle operator only needs one hand to operate the container holder.

In one embodiment of the invention, a container holder for supporting a container comprises a housing having a front and a back and a drawer mounted within the housing for movement between a stored position within the housing and a use position where the drawer extends beyond the front of the housing. First and second arms are movably mounted to the drawer in complementary relationship for interrelated movement between a retracted position and an extended position and have a shape which defines a container receiving area of varying size therebetween. A spring is provided to bias at least one of the first and second arms outwardly of the drawer. The first and second arms are structurally linked together to move in complementary fashion to each other. A first positioning member can be mounted to either the arms or the drawer, and a second positioning member can be mounted to the other of the arms and the drawer which is releasably engagable with the first positioning member to releasably retain the arm in a plurality of adjusted positions with respect to the recess so that the container receiving area can be releasably set in different sizes to accommodate different size containers.

The first positioning member can be a pin and the second positioning member can comprise multiple teeth between which the pin is received to discretely adjust the position of the arms. Further, the first positioning member can be mounted to the drawer and the second positioning member can be formed integrally with one of the first and second arms. In the alternative, the first positioning member can be a pawl and the second positioning member can be a ratchet having multiple detents in which the pawl is received to discretely adjust the position of the arms.

Each of the first and second arms can have a pivot pin which can be pivotally mounted to the drawer through the pivot pin for rotation about a vertical axis. The first and second arms can further include a container platform for supporting the base of a container received within the container receiving area. The drawer can further comprise a container platform for supporting the base of a container received within the container receiving area. The spring can comprise a first spring arm and a second spring arm, the first spring arm being mounted to the drawer and the second spring arm being mounted to one of the first and second arms. The first and second arms can have an arcuate shape to define a portion of the container receiving area.

A release lever can be provided for the container holder which can permit movement of the first and second arms from the retracted position to the extended position without interference between the first and second positioning members, whereby the arms can move unimpeded to the extended position from the retracted position.

The housing can be provided with a sidewall which interfaces with one of the arms to move the arms to the retracted position when the drawer is in the stored position, whereby the arm will automatically move to the outermost position when the drawer is moved to the use position.

The structural linkage between the first and second arms can comprise meshing gear portions on each of the first and second arms.

In a further embodiment of the invention, there are two substantially identical sets of arms pivotably mounted to the drawer through intermediate housings which are themselves pivotably mounted to the drawer.

In another embodiment of the invention, a container holder for supporting a container can comprise a housing having a front and a back, a drawer movably mounted within the housing between a stored position and a use position where the drawer extends beyond the front of the housing, and first and second intermediate housings movably mounted to the drawer between a stored position and a use position. A first spring is disposed between the first and second intermediate housings to bias the housings outwardly with respect to each other. First and second arms are movably mounted to the first intermediate housing in complementary relationship for movement between a retracted position and an extended position so that the first and second arms define a container receiving area of varying size therebetween. A second spring is provided to bias the first and second arms outwardly of the first intermediate housing. The first and second arms are structurally linked together to move in complementary fashion to each other. Third and fourth arms can be movably mounted to the second intermediate housing in complementary relationship for movement between a retracted position and an extended position so that the third and fourth arms define a container receiving area of varying size therebetween. A third spring is provided to bias the third and fourth arms outwardly of the second intermediate housing. The third and fourth arms can be structurally linked together to move in complementary fashion to each other. A first positioning member is mounted to one of the first and third arms and the drawer, and a second positioning member mounted to the other of the first and third arms and the drawer and is releasably engagable with the first positioning member to releasably retain the first and third arms in a plurality of adjusted positions with respect to the recess so that the container receiving area can be releasably set in different sizes to accommodate differently sized containers.

The first and second intermediate housings can be pivotably mounted to the drawer. The housing can be a center console adapted to be mounted between a pair of seats in a vehicle.

In yet another embodiment of the invention, a container holder for supporting a container can comprise a housing having an opening and an adjustable retainer movably mounted to the housing in the opening from a stored position within the housing to a use position wherein the retainer extends beyond the front of the housing. The adjustable retainer can define at least one container receiving area of varying size and which is discretely adjustable to a plurality of adjusted positions between a retracted position and a fully extended position so that the size of the at least one container receiving area is adjustable to accommodate containers of varying size when the adjustable retainer is in the use position. A detent mechanism is also provided adjacent at least one of the container receiving areas to releasably retain the adjustable retainer in the plurality of adjusted positions so that at least one container receiving area can be releasably set in different sizes. The detent mechanism further selectively permits the free movement of the adjustable retainer from the retracted position to the fully extended position when the adjustable retainer is in the use position. The drawer can be pivotably or slidably mounted to the housing for movement between the stored position and the use position.

In an additional embodiment of the invention, a container holder for supporting a container can comprise a housing having an opening and an adjustable retainer movably mounted to the housing in the opening from a stored position within the housing to a use position wherein the retainer extends beyond the housing. A spring biases the adjustable retainer to the use position. The adjustable retainer defines a container receiving area of varying size and which is discretely adjustable to a plurality of adjusted positions between a retracted position and a fully extended position so that the size of the container receiving area is adjustable to accommodate containers of varying size when the adjustable retainer is in the use position. A detent mechanism is mounted to the adjustable retainer to releasably retain the adjustable retainer in the plurality of adjusted positions so that the container receiving area can be releasably set in different sizes, the detent mechanism further selectively permits free movement of the adjustable retainer from the retracted position to the fully extended position when the adjustable retainer is in the use position. A "push-push" actuator is mounted between the housing and the adjustable retainer for selectively retaining the adjustable retainer in the stored position. The housing can be an armrest for a vehicle and the adjustable retainer can be mounted within an opening in a wall of the armrest.

In yet another embodiment of the invention, a container holder for supporting a container can comprise a support having a vertical wall defining a recess and an arm movably mounted to the support in complementary relationship with the recess defining wall for movement between a retracted position proximate the vertical wall and an extended position distal the recess. A spring is located between the arm and the support which biases the arm to the extended position. The recess defining wall and the arm define a container-receiving area of varying size. A push-push mechanism is mounted between the arm and the support for selectively retaining the arm in the retracted position. A detent mechanism is mounted between the arm and the support for selectively retaining the arm in at least one adjusted position with respect to the support between the retracted and extended positions as the arm moves from the extended position to the retracted position whereby the container-receiving area can be releasably set in different sizes to accommodate different size containers. The support can be an armrest which is adapted to be mounted to a vehicle door or mounted between a pair of seats in a vehicle. The arm can have an arcuate portion which forms part of the container receiving area.

In another embodiment of the invention, a push-push detent mechanism can comprise a first member defining an interior chamber and a second member adapted to be telescopically received within the interior chamber of the first member. The second member is movable within the interior chamber between a retracted position and an extended position. A spring biases the second member axially outwardly of the interior chamber of the first member toward the extended position. A first positioning member is provided on one of the first and second members and a second positioning member provided on the other of the first and second members and operably engages the first positioning member. The first positioning member has a first end adapted to retain the second positioning member in the retracted position and a second end adapted to release the second member for movement toward the extended position. At least one detent is located between the first and second ends of the positioning member to releasably retain the second positioning member at a position intermediate the retracted and extended positions.

The first member can be a cylindrical member and the second member can be a piston member. Alternately, the first member can be a rectangular sleeve and the second member can be an elongated plate. The second member can have an upstanding wall which forms part of a container receiving area of a container holder. The first positioning member can comprise a longitudinal protrusion on one of the first and second members. The longitudinal protrusion can have a notch at a first end adapted to retain the second positioning member in the retracted position. The longitudinal protrusion can have at least one laterally-extending detent located between the first and second ends thereof to retain the second positioning member at a position intermediate the retracted and extended positions.

BRIEF DESCRIPTION OF THE DRAWINGS

The invention will now be described with reference to the drawings wherein:

FIG. 3 is a perspective view of the container holder of FIG. 1 with the housing removed for clarity;

FIG. 4 is a top cross-sectional view of the container holder taken along lines 4—4 of FIG. 3;

FIG. 5 is a fragmentary perspective view of the container holder along lines 5—5 of FIG. 4 with elements of the container holder removed for clarity;

FIG. 6 is a perspective view of a first alternative embodiment of the container holder according to the invention in a closed position;

FIG. 7 is a perspective view of the container holder of FIG. 6 in an opened position;

FIG. 8 is a top cross-sectional view of the container holder of FIG. 6 taken along lines 8—8 of FIG. 7;

DESCRIPTION OF THE PREFERRED EMBODIMENT

Figure 2:
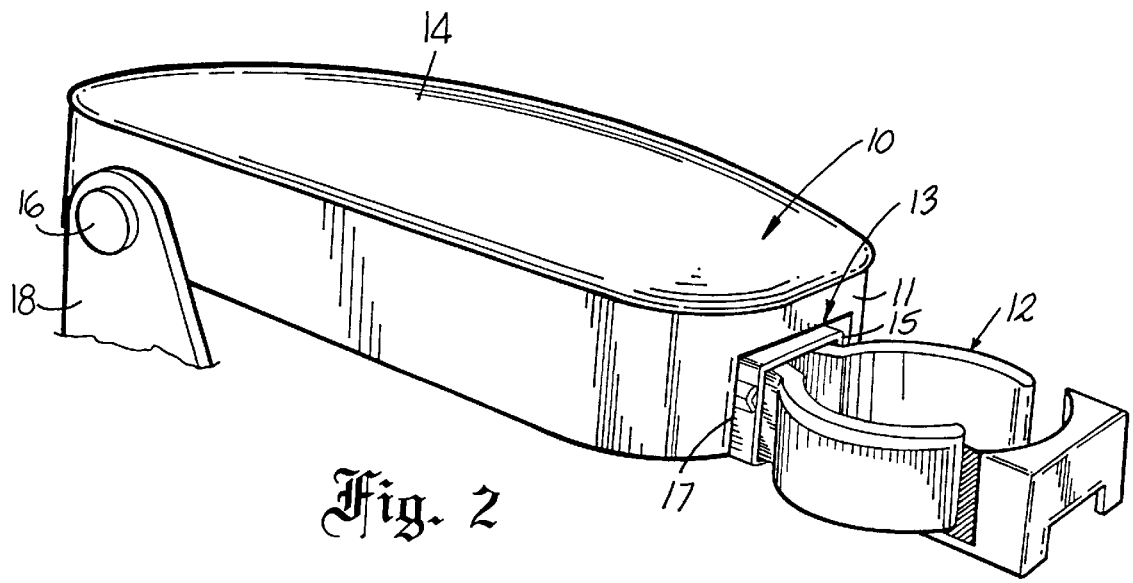
FIG. 2 is a perspective view of the container holder and housing of FIG. 1 in an opened position.
Figure 1:
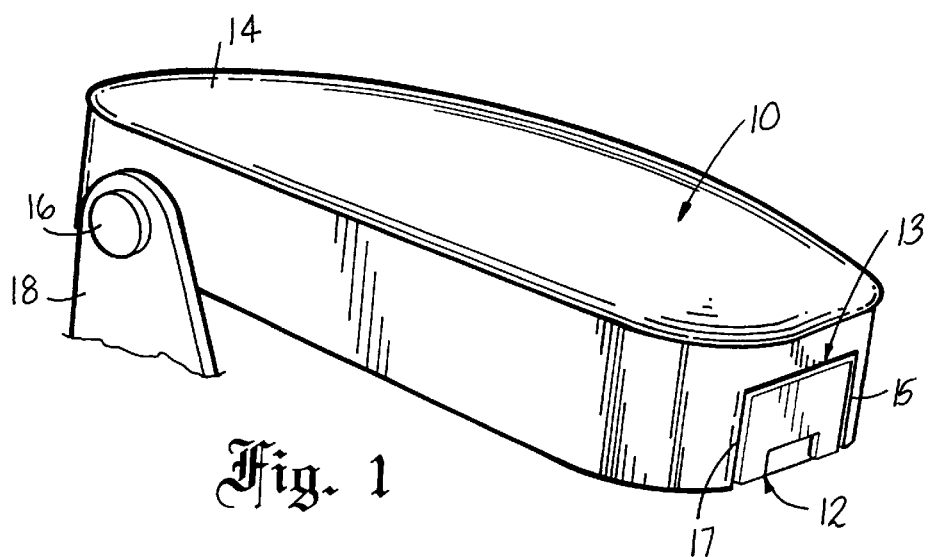
FIG. 1 is a perspective view of the container holder within a housing in a closed position according to the invention.

Referring now to the drawings and to FIGS. 1–5 in particular, a housing 10 slidably mounts a container holder 12 for movement between a closed position as shown in FIG. 1 and an open position as shown in FIG. 2. The housing 10 is typically but not limited to a location located between the front seats within a passenger compartment of a vehicle and is shown comprising a longitudinal component 14 pivotably mounted at 16 to a pair of upwardly extended flanges 18 which are fixedly mounted to the interior of the vehicle. The housing 10 includes a front face 11 which is provided with a rectangular recess 13 having vertical edges 15 and 17. An interior surface of the housing 10 includes a pair of rails (not shown) disposed longitudinally into which the container holder 12 is slidably mounted. It will be understood that the housing 10 may comprise any suitable component mounted to the interior of a vehicle having suitable interior rails for mounting the container holder 12 and that the particular shape or style of the housing 10 is not a limitation to the invention.

Turning to FIG. 3, the container holder 12 comprises a rear housing 20, opposed arms 22 and 24, and tray 26. Unless otherwise specified, all parts of the container holder 12 are molded from a suitable rigid plastic material.

The rear housing 20 is a box-shaped component defined by a base 28 having vertical sidewalls 30 and 32 extending upwardly from the longitudinal edges of base 28 and a rear wall 34 extending upwardly from a rear transverse edge (not shown) of base 28, and a ceiling 36 extending across the upper edges of sidewalls 30 and 32 and rear wall 34. Each vertical sidewall 30 and 32 includes a mounting rail 38 disposed longitudinally along a central portion of the sidewalls 30 and 32 and configured such that they can be slidably mounted to the mating longitudinal rails (not shown) on the housing 10 as illustrated in FIG. 2. A central pin 40 is vertically disposed from a central front portion of the ceiling 36 to the base 28. First and second pins 42 and 44, respectively, are similarly vertically disposed slightly angularly rearwardly on either side of the central pin 40. The pins 40, 42 and 44 can either be formed of a rigid metal or molded directly to the arms 22 and 24 and mounted into corresponding molded recesses in the base 28 and ceiling 36. The interior surface of the vertical sidewall 32 includes a spring 46 of spring wire having a downwardly extending pawl 47 mounted in cantilever fashion as shown in FIG. 4.

The tray 26 comprises a flat platform 48 integrally molded to and extending forwardly of the base 28 of rear housing 20 and further has a flange 50 extending upwardly from a forward end of the platform 48. The flange 50 includes a concave interior surface 52 and a convex exterior surface 54 which can be provided with a decorative face plate or an integrally-molded handle shown at 56.

Turning to FIG. 4, the first opposed arm 22 comprises an outwardly extending curved portion 60 having a distal tip 62 and a proximal base 64. The base 64 comprises a laterally-extending portion including a central aperture 66 and a rounded exterior portion 68 along which radially-extending gear teeth 70 are disposed.

The second opposed arm 24 comprises an outwardly extending curved portion 80 having a distal tip 82 and a proximal base 84. The proximal base 84 comprises a rearwardly-extending tapering arm 86 having a central aperture 88, a rear flange 90 and a ratchet-containing base 92.

As shown in FIG. 4 and in greater detail in FIG. 5, the rear flange 90 comprises a rectangular base 94 extending transversely outwardly from each corner of the rearward edge of tapering arm 86 and further includes an upwardly-extending ratchet 96. The ratchet 96 has a forward surface 98 opposite a plurality of inwardly curved detents 100 disposed between a rounded leading edge 99 and an opposite end 97.

Returning to FIG. 4, the ratchet-containing base 92 extends from the tapering arm 86 and comprises a circular portion 102 concentrically aligned with the aperture 88 in the tapering arm 86 and further provided with radially-extending gear teeth 104 disposed around the circumference of the circular portion 102 in meshing relationship with gear teeth 70. The tapering arm 86 mounts an arm spring 106 of spring wire having first and second legs 108 and 110, respectively, and a central coil 112 fixedly mounted concentrically around the aperture 88 in the tapering arm 86 such that the first leg 108 extends longitudinally and rearwardly along the tapering arm 86 and is mounted fixedly thereto and further such that the second leg 110 of the arm spring 106 extends transversely and inwardly of the tapering arm 86.

In assembly, the first opposed arm 22 is pivotably mounted to the rear housing 20 by passing pin 42 through the aperture 66 in the proximal base 64 of the first arm 22 such that the curved portion 60 extends outwardly of the rear housing 20. The second opposed arm 24 is pivotably mounted to the rear housing 20 by passing pin 44 through the aperture 88 in the trailing arm 86 of the second opposed arm 24 such that the curved portion 80 extends outwardly of the rear housing 20. Further, the second opposed arm 24 must be mounted subject to three physical restraints on the second arm 24. First, the tapering arm 86 of the second opposed arm 24 extends rearwardly a sufficient distance from the ratchet 96 extending upwardly from the rectangular flange 94 at the end of the tapering arm 86 to encounter the pawl 47 on the cantilevered spring 46 extending inwardly from the sidewall 32. Second, the radially-extending gear teeth 104 on the rounded portion 102 of the second opposed arm 24 interlockingly engage with the radially-extending gear teeth 70 of the first opposed arm 22 such that an inward or outward movement of either of the first or second opposed arms 22 or 24, respectively, will produce a corresponding inward or outward movement of the other arm. Third, the second opposed arm 24 is mounted such that the transversely extending second leg 110 of the arm spring 106 abuts the central pin 40 of rear housing 20 such that the arm spring 106 outwardly biases the second opposed arm 24. Thus, the arm spring 106 will also outwardly bias the first opposed arm 22 through the interlocking engagement of the gear teeth 70 of the first opposed arm 22 and the gear teeth 104 of the second opposed arm 24. The rails 38 disposed longitudinally along each vertical sidewall 30 and 32 of the container holder 12 can then be inserted into the mating rails (not shown) along the interior of the housing 10 as illustrated in FIG. 2. It should be noted that the first opposed arm 22 and the second opposed arm 24 are biased outwardly by arm spring 106 and constrained by the locking action of the cantilevered spring 46 within the detents 100 of ratchet 96 such that the opposed arms 22 and 24 define a cup receiving area shown generally at 114.

In operation, the container holder 12 is stored within the housing 10 in a position such that the opposed arms 22 and 24 are pressed together by the interior walls of the housing 10 and further such that the rectangular base 94 which extends axially from the tapering arm 86 of second opposed arm 24 is pivoted a sufficient distance such that the pawl 47 on the cantilevered spring 46 is positioned axially beyond the end 97 on the ratchet 96 as shown in the dashed outline of FIG. 4. To extend the container holder 12 into the open position as shown in FIG. 2, the exterior surface 54 of the upwardly extending flange 50 may be grasped such as by handle 56 and pulled outwardly. Upon doing so, the arm spring 106 will bias the opposed arms 22 and 24 apart from each other such that the cantilevered spring 46 travels along the forward surface 98 of ratchet 96 and rests adjacent the first detent 100 along the leading edge 99 of ratchet 96. When the container holder 12 is in this first use position, the opposed arms 22 and 24 are in their most outward position and define the largest opening possible for retaining a cup. If a smaller cup opening is desired, the user can independently or simultaneously pivot one or both of the arms 22 or 24 inwardly such that the pawl 47 of the cantilevered spring 46 engages the first detent 100 of the ratchet 96. The cup-receiving area 114 can be reduced in size by the user by further pivoting the opposed arms 22 and 24 inwardly so that the pawl 47 of the cantilevered spring 46 engages the next successive detent 100 on the ratchet 96. As seen in greater detail in FIG. 5, once the final detent 100 is passed, the pawl 47 on the cantilevered spring 46 passes around the end 97, along the forward surface 98, and rests along the leading edge 99. In this latter position, the opposed arms 22 and 24 will be returned to their outermost position. It will be understood that although three detents 100 are shown on ratchet 96 defining three successive discrete inward positions of the opposed arms 22 and 24, any number of detents 100 may be defined on the ratchet 96 to define further arm adjustment positions.

As the container holder 12 is returned into the housing 10, the vertical edges 15 and 17 of the recess 13 force the opposed arms 22 and 24 into their innermost position in which the pawl 47 of the cantilevered spring 46 pass beyond the end 97 of the ratchet 96. Conversely, when the container holder 12 is pulled out, the opposed arms 22 and 24 will spring out to the outermost position for receipt of a cup or similar container. The user can then adjust the arms inwardly independently of each other to adjust the size of the arms 22 and 24 to fit containers of various sizes as described above.

FIGS. 6–8 illustrate a first alternative embodiment of a housing 200 provided with a frontal rectangular recess 202 having vertical edges 203 and 205 into which a drawer 204 is slidably mounted from a closed position as shown in FIG. 6 to an open position as shown in FIG. 7. The housing 200 is typically located between the front seats or any other suitable location within the passenger compartment of a vehicle.

Turning to FIG. 7, drawer 204 comprises a lower platform 206, an upper platform 208, a first container holder 210, and a second container holder 212. The lower platform 206 comprises a longitudinally-extending flat portion 214 having an upwardly extending front perpendicular flange 216. The front flange 216 can include a decorative face plate or can further include a transversely-extending recess 218 defining a handle which may be used by the user to pull out the drawer 204.

The upper platform 208 comprises a rearwardly-extending flat portion 220 having mounting recesses 222, 224 and 226 disposed along the front portion of the upper platform 208.

The first container holder 210 comprises a rear housing 228, first and second outwardly biased opposed arms 230 and 232, respectively, and a tray 234 defining a cup-receiving area 236. The second container holder 212 comprises a rear housing 238, first and second outwardly biased opposed arms 240 and 242, respectively, and a tray 244 defining a cup-receiving area 246. The first and second container holders 210 and 212, respectively, are preferably discretely adjustable by use of a pawl and ratchet-type mechanism similar to the pawl and ratchet mechanism described with respect to the first embodiment in FIGS. 1–5.

In assembly, the first and second container holders 210 and 212, respectively, are pivotally mounted to the drawer 204 by pins 248 and 250 which pass through apertures 252 and 254 disposed along the interior rear corners of the rear housings 228 and 238 of container holders 210 and 212, respectively. Pins 248 and 250 can either be separate components or integrally molded with the rear housing 228 and 238 which extend through the recesses 222 and 224, respectively, on the upper platform 208 and corresponding recesses (not shown) on the lower platform 206. A central pin 256 is disposed between the first and second pins 248 and 250, respectively, and extends through the recess 226 on the upper platform 208 and to a corresponding recess (not shown) on the lower platform 206. An arm spring 258 having a central coil 260 and a pair of outwardly-biased radially-extending legs 262 and 264 is fixedly mounted to the central pin 256 such that the central coil 260 is disposed around the central pin 256. The legs 262 and 264 abut the vertical sidewalls of the rear housing 228 of the first container holder 210 and the rear housing 238 of the second container holder 212, respectively, such that the depending legs 262 and 264 of the arm spring 258 bias the container holders 210 and 212 radially outwardly about the pins 248 and 250. The lower platform 206 and the upper platform 208 are joined at their rearward edges by vertical sidewalls (not shown) forming a box-like assembly on the drawer 204 which is matingly slidably inserted into the recess 202 on the front portion of the housing 200.

In operation, the drawer 204 is initially retained within the housing 200 so that the front flange 216 of the drawer 204 is flush with the edges of the recess 202 in the front portion of the housing 200 and the opposed arms 230, 232, 240 and 242 of the container holders 210 and 212 are biased against the interior sidewalls (not shown) of the housing 200. To move the drawer 204 from the stored position as shown in FIG. 6 to the use position as shown in FIG. 7, the operator of the vehicle grasps the drawer 204, preferably by inserting the user's fingers within the recess 218 of the drawer 204 and pulling outward. As the opposed arms of the container holders 210 and 212 clear the vertical edges 203 and 205 of the recess 202 of the housing 200, the opposed arms 230, 232, 240 and 242 spring outwardly with respect to the container holders 210 and 212 to their most outward position and define the largest opening possible for retaining a cup. In addition, as the drawer 204 is pulled further outwardly such that the rear housings 228 and 238 of the container holders 210 and 212 clear the frontal opening 202 of the housing 200, the first and second legs 262 and 264 of arm spring 258 force the container holders 210 and 212 angularly outwardly as shown in the final open position in FIG. 7.

Figure 9:
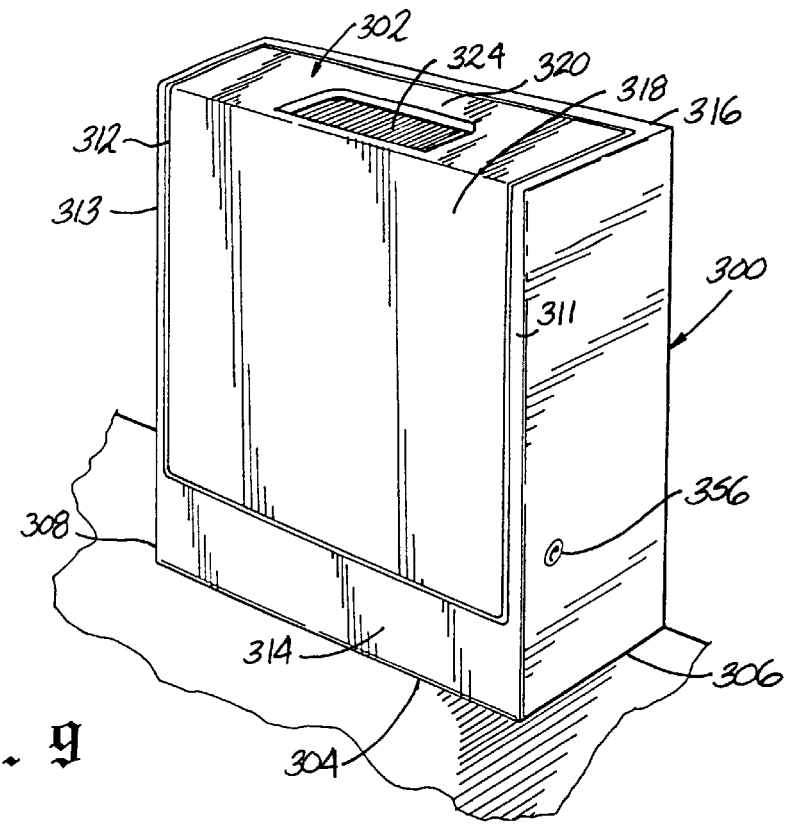
FIG. 9 is a perspective view of a second alternative embodiment of the container holder according to the invention in a closed position.
Figure 10:
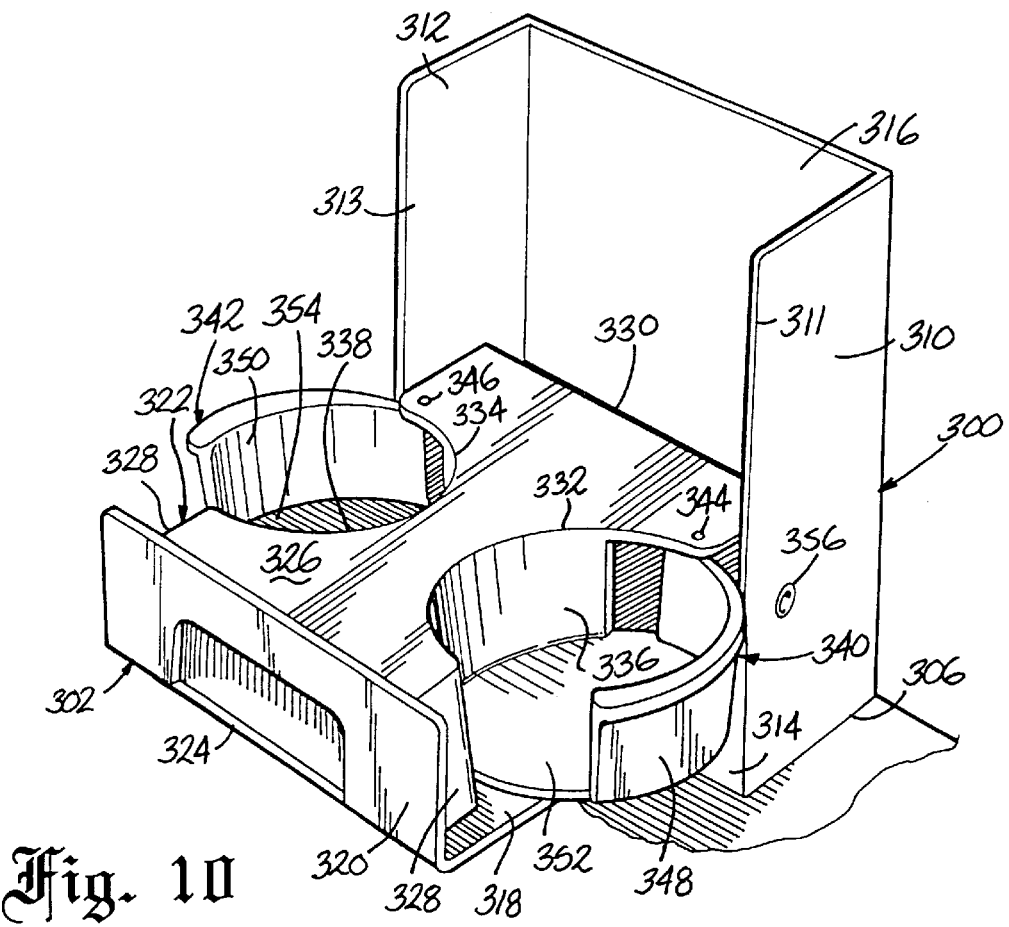
FIG. 10 is a perspective view of a second alternative embodiment of the container holder of FIG. 9 in an opened position.

FIGS. 9–10 illustrate a housing 300 into which a container holder 302 is pivotably mounted from a closed position as shown in FIG. 9 to an opened position as shown in FIG. 10. The housing 300 may be mounted into any suitable recess within a vehicle such as within a dashboard, adjacent to one or more of the passenger seats in a larger passenger vehicle such as a conversion van, or suitably mounted in the living compartment of a mobile home or RV.

The housing 300 comprises a rectangular base 304 having first and second ends 306 and 308 vertical sidewalls 310 and 312 having forward edges 311 and 313, a front base 314, and rear wall 316. Vertical sidewall 310 is rectangular in shape and extends upwardly from the edge 306 of the base 304. Vertical sidewall 312 is rectangular in shape and extends upwardly from edge 308 of the base 304. Front base 314 is a short, wide rectangular portion extending upwardly from a forward edge of the base 304 and transversely to the lower forward edges of vertical sidewalls 310 and 312. Rear wall 316 is a large rectangular wall portion extending to the rearward edges of vertical sidewalls 310 and 312 and the rearward edge of base 304.

Container holder 302 comprises a rectangular base 318 having a perpendicularly-extending front plate 320, and a suspended wall 322. The front plate 320 can include a rectangular recess 324 which can serve as a handle for the user to open and close the container holder 302 into or out of the housing 300. The suspended wall 322 comprises an hourglass-shaped horizontal portion 326 defined by first and second semicircular recesses 332 and 334 extending inwardly from opposite longitudinal sides of the hourglass-shaped portion 326 is suspended a short distance above the rectangular base 318 by a mounting to the rear face of front plate 320, a pair of forward depending walls 328 mounted to the interior face of the rectangular base 318, and a rear transverse wall (not shown) extending downwardly from a rear edge 330 of the horizontal portion 326 and mounted to the interior face of rectangular base 318. The first and second semicircular recesses 332 and 334 include interior depending semicircular vertical walls 336 and 338, respectively, extending downwardly from the upper edge of first and second semicircular recesses 332 and 334 and terminating a short distance above the rectangular base 318. A pair of opposed arms 340 and 342 are pivotably mounted to the hourglass-shaped portion 326 by vertical mounting pins 344 and 346 and comprise a downwardly-extending arcuate portion 348 and 350, each provided with a horizontal container platform 352 and 354. The mounting pins 344 and 346 are mounted to the hourglass-shaped portion 326, extend downwardly through an internal shaft of the opposed arms 340 and 342, and further mount to the rectangular base 318 to complete the pivotal mounting of the opposed arms 340 and 342 to the suspended wall 322 and to the rectangular base 318. The opposed arms 340 and 342 are preferably outwardly biased and discretely adjustable by use of a pawl and ratchet-type mechanism similar to the pawl and ratchet mechanism shown in the earlier-described embodiments such that the opposed arms 340 and 342 are discretely movable with respect to the semicircular recesses 332 and 334 of the hourglass-shaped portion 326 of the suspended wall 322 to vary the useable size of the container-receiving area defined between the semicircular depending walls 336 and 338 and the opposed arms 340 and 342. Finally, the container holder 302 is pivotably mounted to the housing 300 by an inwardly disposed pin mounting 356 disposed near the forward edges 311 and 313 such that the container holder 302 may be rotated downwardly and outwardly from the closed position shown in FIG. 9 to the opened position shown in FIG. 10. When opened, the rectangular base 318 of the container holder 302 can rest on the upper edge of the front base 314 such that the front base 314 provides support to the container holder 302 in the opened position. Additionally, the housing 300 can include an internal stop (not shown) to retain the container holder 302 at a particular opened position.

In operation, the container holder 302 is initially retained within the housing 300 so that the front plate 320 is disposed adjacent the upper edges of vertical sidewalls 310 and 312 and rear wall 316 such that the opposed arms 340 and 342 are biased against the interior surfaces of vertical sidewalls 310 and 312 of the housing 300. To move the container holder 302 from the stored position as shown in FIG. 9 to the use position in FIG. 10, the user grasps the container holder 302, preferably by inserting the user's fingers within the recess 324 of the front plate 320 and pulling outwardly and downwardly on the container holder 302. As the opposed arms 340 and 342 clear the forward edges 311 and 313 of sidewalls 310 and 312, the opposed arms 340 and 342 are biased outwardly about the mounting pins 344 and 346. When the container holder 302 is initially positioned for use as shown in FIG. 10, the opposed arms 340 and 342 are in their most outward position and define the largest opening possible for retaining a cup. If a smaller cup opening is desired, the user can independently pivot either of the opposed arms 340 and 342 such that the pawl and ratchet mechanism for either arm retains the opposed arms 340 and 342 in a further inward position. As the container holder 302 is returned to the housing 300, the forward edges 311 and 313 of the vertical sidewalls 310 and 312 force the opposed arms 340 and 342 into their innermost position for storage within the housing 300.

Figure 11:
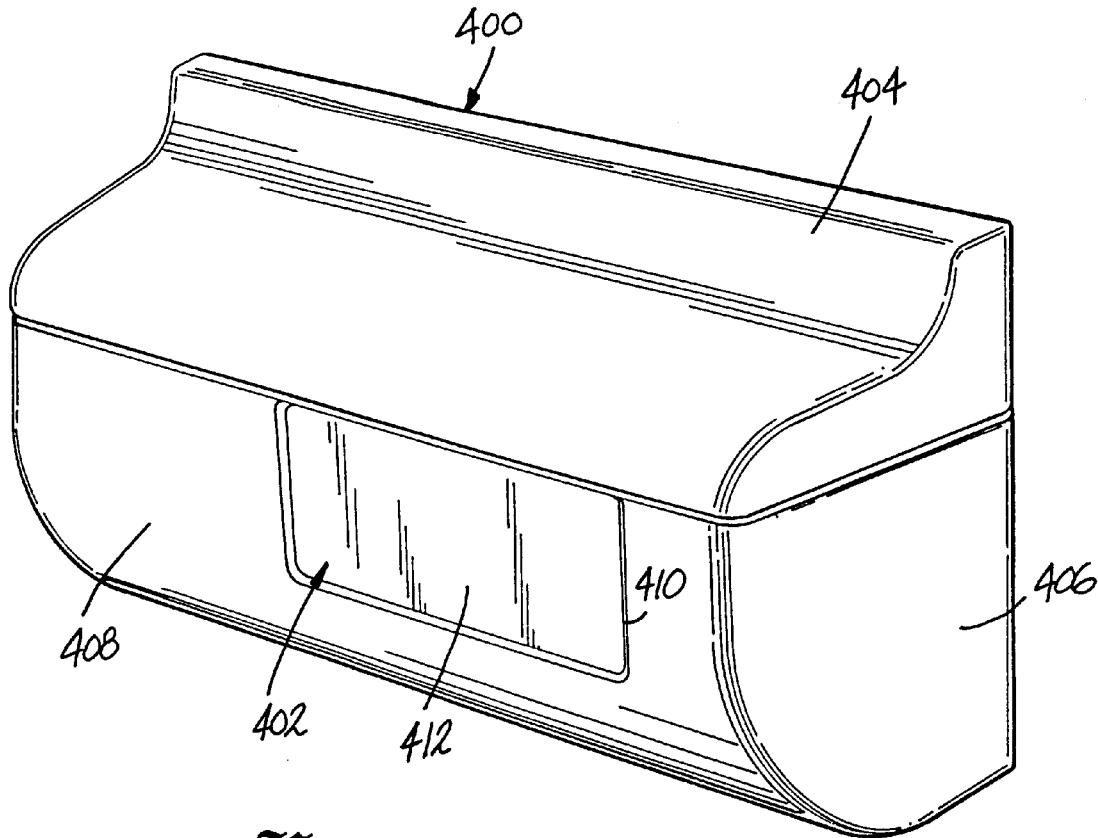
FIG. 11 is a perspective view of a third alternative embodiment of the container holder according to the invention in a closed position.
Figure 12:
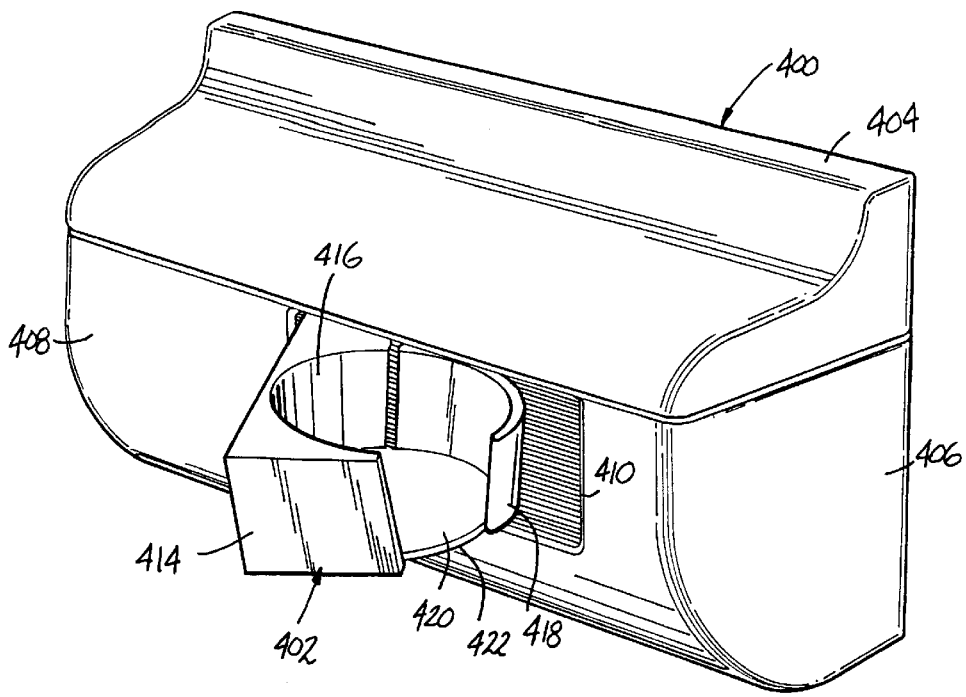
FIG. 12 is a perspective view of a third alternative embodiment of the container holder of FIG. 11 in an opened position.

FIGS. 11–14 illustrate a third alternative embodiment of a housing 400 into which a container holder 402 is pivotably mounted for movement from a closed position as shown in FIG. 11 to an open position as shown in FIG. 12. The housing 400 can be mounted to any suitable portion within a vehicle but the housing 400 of this embodiment will typically comprise an armrest integrally formed with or mounted to an interior central portion of a vehicle door.

The housing 400 comprises an armrest 404 of a conventional shape and styling used in vehicles and a base 406 having a front flat portion 408 which includes a rectangular recess 410 in which the container holder 402 is pivotably mounted for movement from a stored position where it is disposed within the housing 400 to a use position where it is pivoted beyond the exterior of the flat portion 408 of the base 406 as shown in FIG. 12. A decorative trimplate 412 can be mounted to a front face of the container holder 402 to match the coloring and material of the flat portion 408 of the base 406.

The container holder 402 comprises a vertically-depending container housing 414 having a semi-circular depending wall 416 along its interior surface and an oppositely-disposed pivotally-mounted arcuate arm 418 such that the depending wall 416 and the arm 418 define a container-receiving area 420. The lower interior edge of the semi-circular depending wall 416 supports a platform 422 forming the base of the container-receiving area 420.

The arcuate arm 418 of the container holder 402 is preferably discretely adjustable by use of a pawl and rachet-type mechanism similar to the pawl and rachet mechanism described with respect to the first embodiment. The pawl and rachet mechanism can be mounted to the container housing 414 such that the arcuate arm 418 is discretely movable with respect to the container housing 414 to vary the useful size of the container-receiving area 420.

Preferably, the container housing 414 is mounted to a locking mechanism 424 (shown in FIGS. 13 and 14) within the recess 410 of the flat portion 408 and is biased outwardly from the housing 400. The locking mechanism 424 is preferably of the type that is unlocked by a normal force applied to the front face 412 of the container holder 402 causing a slight inward movement of the container holder 402. Upon release of such force, the locking mechanism will force the container holder 402 outwardly into the use position as shown in FIG. 12. When it is desired to return the container holder 402 to the stored position as shown in FIG. 11, a similar normal force to the front face 412 of the container holder 402 can pivotably return the container holder 402 into the recess 410 of the housing 400. The force must be sufficient to actuate the locking mechanism 424 to retain the container holder 402 within the housing 400.

Figure 13:
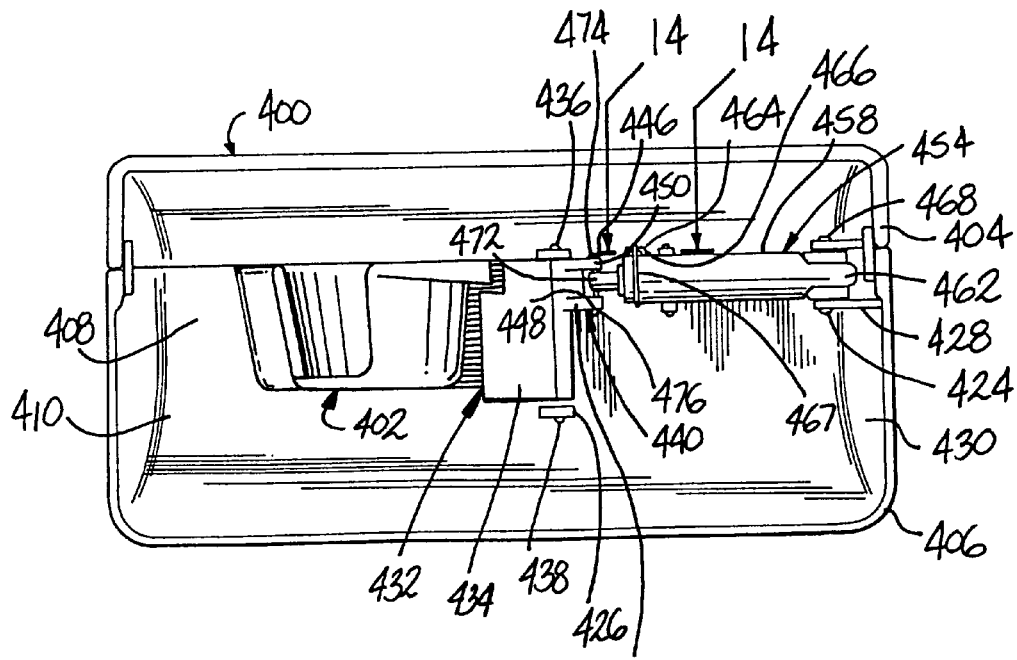
FIG. 13 is a rear view of the container holder of FIG. 11.

Turning to the rear view of the housing 400 as shown in FIG. 13, the pivotable mounting of the container holder 402 and the locking mechanism, also referred to as a "push-push" mechanism, shown generally at 424 are shown in greater detail. The base 406 includes a first inwardly disposed mounting flange 426 extending inwardly from an interior surface of the flat portion 408 of the base 406 and second mounting flange 428 extending longitudinally inwardly from a sidewall 430 of the base 406. Each of the first and second mounting flanges 426 and 428, respectively, preferably comprise a pair of vertically disposed looped flanges having a central vertical aperture for receiving opposite ends of a part between the looped flanges and to retain the same by a pin or other protrusion.

The rearward portion of the container holder 402 includes a rearwardly extending flange 432 comprising a parallelpiped housing 434 extending angularly rearwardly of the container housing 414 and further including a first protrusion 436 extending upwardly from a top surface of the housing 434 and second protrusion 438 extending downwardly from a bottom surface of the housing 434. The housing 434 further includes a lateral flange 440 located rearwardly of a vertical axis defined by the protrusions 436 and 438 and comprising a pair of horizontally extending flanges 442 and 444 each having a central vertical aperture 446 and 448 at their respective distal ends 450 and 452.

The locking mechanism 424 comprises a cylinder 454 having an outwardly-biased piston 456 extending axially therefrom. The cylinder 454 includes a longitudinal section 458 having a proximal end 460 and distal end 462. The proximal end 460 of the cylinder 454 has a pin 464 mounted to an upper surface of the proximal end 460 of the cylinder 454 which includes a depending portion 466 downwardly biased by a circumferential band 468 which extends around the proximal end 460 of the cylinder 454 over the pin 464 and applies a downward pressure thereto to downwardly bias the depending portion 466. The distal end 462 includes a first protrusion 468 extending upwardly from the distal end 462 and a second protrusion 470 extending downwardly from the distal end 462.

The piston 456 of the locking mechanism 424 is biased outwardly in an axial direction by an internal spring within the cylinder 454 and includes at a distal end 472 a first protrusion 474 extending upwardly from the distal end 472 and a second protrusion 476 extending downwardly from the distal end 472.

In assembly, the protrusions 436 and 438 of the rear container housing 434 are lockingly engaged within the first mounting flange 426 to mount the container holder 402 for pivotable movement about the vertical axis defined by the protrusions 436 and 438. The protrusions 468 and 470 of the distal end 462 of the cylinder 454 are lockingly engaged within the second mounting flange 428, extending inwardly from the sidewall 430 of the housing 400 such that the cylinder 454 and the piston 456 extend longitudinally inwardly toward the container holder 402. The protrusions 474 and 476 of the distal end 472 of the piston 456 are lockingly engaged within the vertical apertures 446 and 448 within the horizontal flanges 442 and 444 of the housing 434. Due to the rearward location of the connection point of the piston 456 to the axial flange 440 of the housing 434 with respect to the pivotal mounting of the housing 434 to the housing 400, the axial flange 440 serves as a lever arm for rotation of the container holder 402 about the vertical axis defined by the protrusions 436 and 438 such that inward or outward axial movement of the piston 456 produces a corresponding inward or outward rotation of the container holder 402 about the vertical axis defined by the protrusions 436 and 438.

Figure 14:
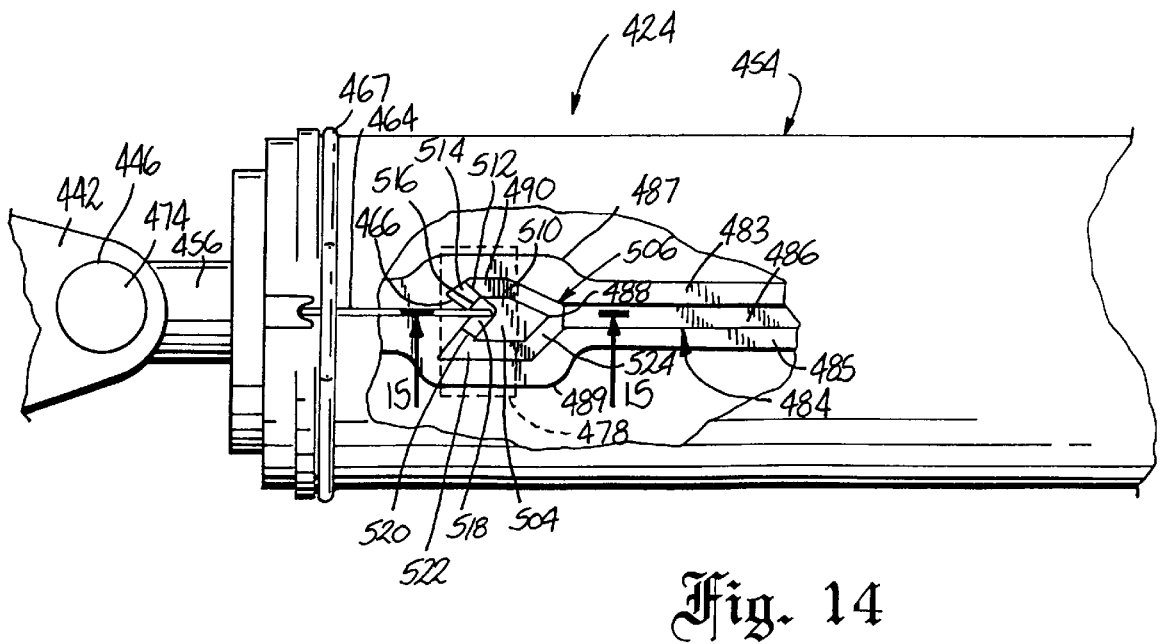
FIG. 14 is an enlarged top view of the container holder taken along lines 14—14 of FIG. 13 with elements of the container holder removed for clarity.
Figure 15:
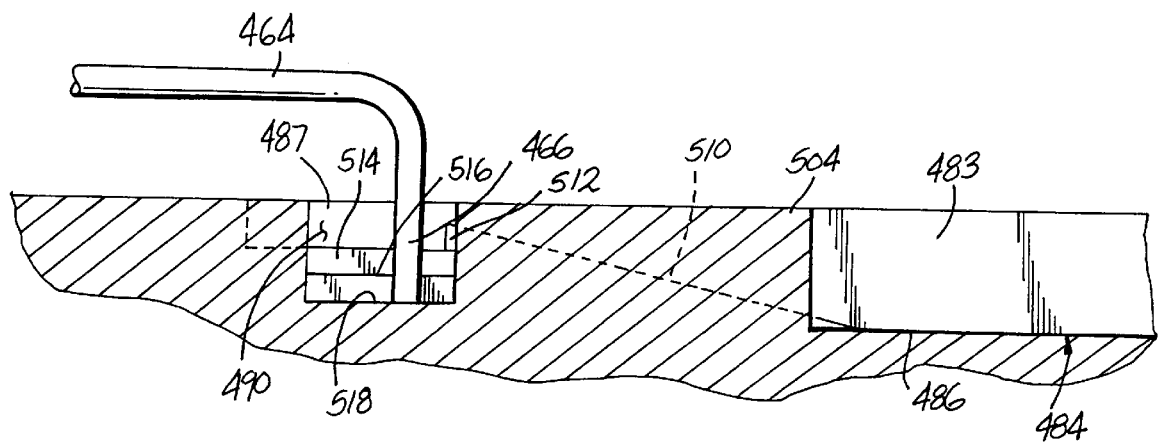
FIG. 15 is a cross-sectional view of the container holder taken along lines 15—15 of FIG. 14.

The locking mechanism 424 is shown in greater detail in FIGS. 14 and 15. Turning to FIGS. 14–15, the upper surface of the cylinder 454 includes a transverse slot 478 (shown in outline form) which exposes a pair of upstanding walls 483 and 485 having transversely extending portions 487 and 489 which define opposing walls of a slot 484 disposed along the piston 456 within the cylinder 454. The slot 484 within the piston 486 comprises a longitudinal narrow slot 486 which widens angularly at 488 into a heart-shaped chamber 490 defined between the transversely extending portions 487 and 489 of opposing walls 483 and 485, respectively. A heart-shaped block 504 extends concentrically upwardly from the floor of the heart-shaped chamber 490 to define a heart-shaped slot 506 in the gap between the heart-shaped chamber 490 and heart-shaped block 504. The heart-shaped slot 506 comprises an upwardly ramped portion 510 terminating in a first downward step 512, a further downward ramp 514 terminating in a second downward step 516 which extends into a valley 518. The valley 518 extends into a downwardly-extending ramp 520 terminating at a third downward step 522. The third downward step 522 extends into downward ramp 524 which terminates at a fourth downward step 526 at the widening area 488 of the longitudinal narrow slot 486. The depending portion 466 of the downwardly-biased pin 464 rests within the valley 518 of the heart-shaped slot 506 when the container holder 402 is in the closed position within the housing 400 as shown in FIG. 11. The downward steps 512, 516, 522 and 526 and the slopes of the ramps 510, 514, 520 and 524 are designed such that the depending portion 466 of the pin 464 is constrained to travel only in a counterclockwise direction around the heart-shaped slot 506.

In operation, to position the container holder 402 in the open position as shown in FIG. 12, a small normal force must be applied to the front face 412 of the container holder 402. As this inward force is applied, the piston 456 attached to the axial flange 440 on the container housing 402 will be displaced slightly inwardly by the inward normal force applied to the container holder 402. This inward movement of the piston 456 causes the depending portion 466 of the pin 464 to be pressed against the second heart-shaped portion 504 and slide along the downward ramp 520 and down the third step 522. As the normal force applied to the container holder 402 is released, the outwardly axially-biased piston 456 will be driven outwardly and axially by the internal spring within the cylinder 454. This outward movement of the piston 456 will cause the depending portion 466 of the pin 464 to slide along the downward ramp 524, down the fourth step 526 and to slide longitudinally along the narrow longitudinal slot 486 until the piston 456 is fully extended and pivotably rotates the container holder 402 outwardly into the position shown in FIG. 12.

In order to return the container holder 402 into the stored position as shown in FIG. 11, an inward normal force must be applied to the front face 412 of the container holder 402. As this inward normal force is applied, the piston 456 will be urged into the cylinder 454 such that the depending portion 466 of pin 464 will slide along the narrow longitudinal slot 486 toward the proximal end 460 of the cylinder 454. As the depending portion 466 of the pin 464 reaches the widening area 488 of the slot 486, it is urged onto the upwardly ramped portion 508 of the heart-shaped slot 506 due to the ridge formed by the fourth downward step 526 which prevents the pin 564 from entering the downward ramp portion 524. The depending portion 466 of the pin 464 travels along the flat portion 508, travels up the upwardly ramped portion 510 and over the first downward step 512. At this point the inward normal force applied to the front face 412 of the container holder 402 can be released. The internal spring within the cylinder 454 then urges the piston 456 outwardly. However, the outward travel of the piston 456 is limited by the travel of the depending portion 466 of the pin 464 which is then forced down the downward ramp 514, down the second downward step 516 and is kept at rest within the valley 518 between the lobes of the second heart-shaped portion 504 and is thus returned to the stored position as shown in FIG. 11.

Figure 16:
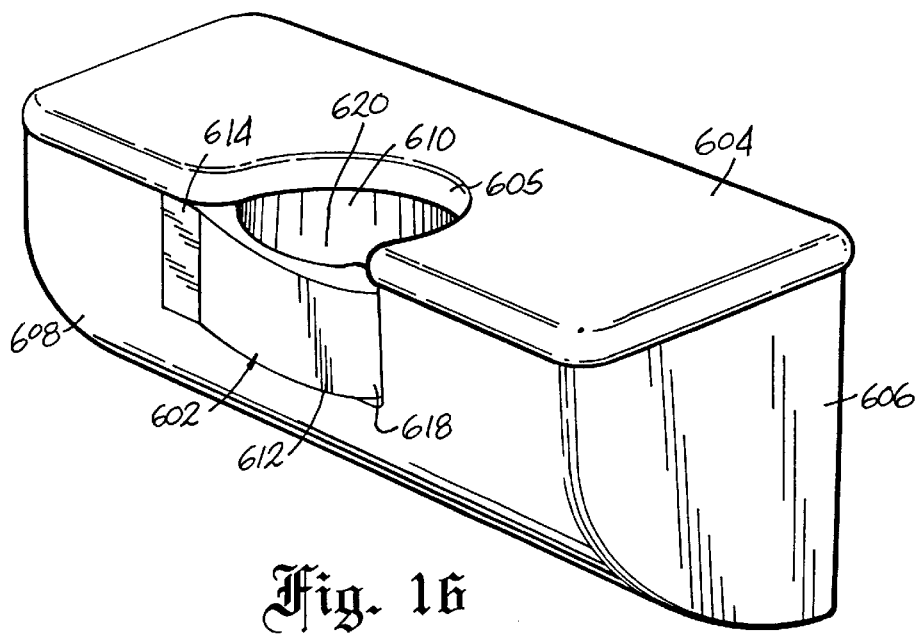
FIG. 16 is a perspective view of a fourth alternative embodiment of the container holder according to the invention in a closed position.
Figure 17:
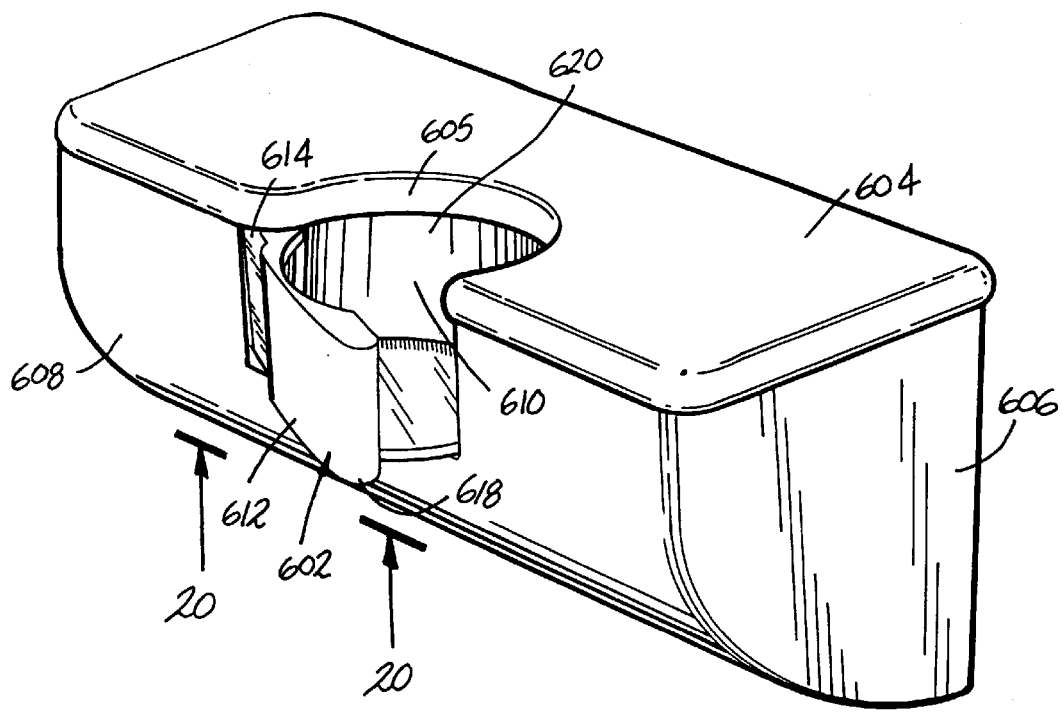
FIG. 17 is a perspective view of the container holder of FIG. 16 in an opened position.

FIGS. 16–20 illustrate a fourth alternative embodiment of a housing 600 into which a container arm 602 is pivotably mounted for movement from a retracted position as shown in FIG. 16 to an extended position as shown in FIG. 17. The housing 600 can be mounted to any suitable portion within a vehicle but the housing 600 of this embodiment will typically comprise an armrest integrally formed with or mounted to an interior central portion of a vehicle door.

The housing 600 comprises an armrest 604 having a semicircular indentation 605 extending inwardly from a central forward portion of the armrest 604 and a base 606 having a forward flat portion 608 which includes an inwardly-extending semicylindrical wall 610. The container arm 602 is pivotably mounted to the base 606 for movement from a retracted position where it is disposed adjacent the flat portion 608 of the base 606 to an extended position where it is pivoted beyond the exterior of the flat portion 608 of the base 606 as shown in FIG. 17. The semicylindrical wall 610 is in vertical alignment with the semicircular indentation 605 on the armrest 604. A decorative trimplate 612 can be mounted to a front face of the container arm 602 to match the coloring and material of the flat portion 608 of the base 606.

The container arm 602 comprises a vertically-depending container housing 614 having an outwardly-extending arcuate arm 618 pivotably mounted thereto such that the arcuate arm 618, semicircular indentation 605 and semicylindrical wall 610 define a container receiving area 620. The lower interior edge of the arcuate arm 618 supports a platform 622 forming the base of the container receiving area 620.

Alternatively, the platform 622 can be fixed to the armrest 604 at the base of wall 610.

Figure 19:
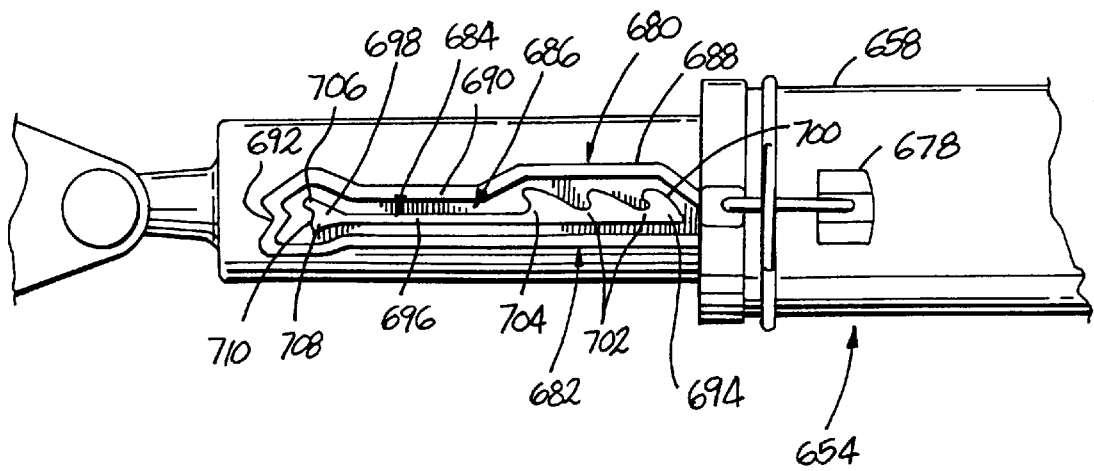
FIG. 19 is an enlarged top view of the container holder taken along lines 19—19 of FIG. 16 with elements of the container holder removed for clarity.

As shown in FIG. 19, the arcuate arm 618 of the container arm 602 is preferably discretely adjustable by use of a locking/ratcheting mechanism 624 comprising a pawl and ratchet as shown in FIG. 5 disposed within a locking mechanism as shown in FIGS. 13–15 which is mounted to the container housing 614 such that the arcuate arm 618 is discretely movable with respect to the container housing 614 to vary the useful size of the container-receiving area 620. This type of locking mechanism is also referred to as a "push-push detent" mechanism because the locking mechanism can retain the arm 602 in a retracted position, as well as allow the arm 602 to be positioned in one of several discrete positions intermediate the retracted and extended positions.

Figure 18:
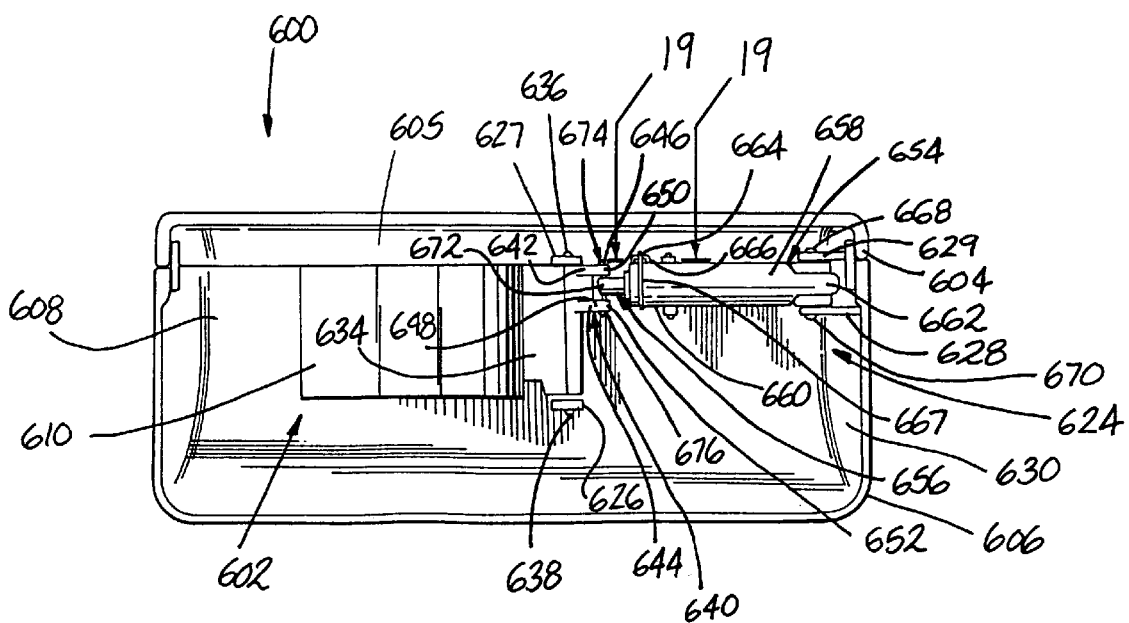
FIG. 18 is a rear view of the container holder of FIG. 16.

Preferably, the container housing 614 is mounted to the locking/ratcheting mechanism 624 shown in FIGS. 18 and 19 and is biased outwardly from the housing 600 by an arm spring mounted in the longitudinal section 658. The locking/ratcheting mechanism 624 is preferably of the type that is unlocked by a normal force applied to the front face 612 of the container arm 602 causing a slight inward movement of the container arm 602. Upon release of such force, the locking/ratcheting mechanism 624 will force the container arm 602 outwardly to its greatest outward radial position as shown in FIG. 17. The container arm 602 can then be discretely adjusted inwardly to one of several positions by applying an additional normal force to the front face 612 of the container arm 602 and releasing when the desired position is achieved. When it is desired to return the container arm 602 to the retracted position as shown in FIG. 16, a normal force to the front face 612 of the container arm 602 can pivotably return the container arm 602 into planar alignment with the front face 612 of the housing 600. The force must be sufficient to actuate the locking/ratcheting mechanism 624 to retain the container arm 602 within the housing 600.

Turning to the rear view of the housing 600 as shown in FIG. 18, the pivotable mounting of the container arm 602 and the locking mechanism shown generally at 624 are shown in greater detail. The base 606 includes a first inwardly disposed mounting flange 626 extending inwardly from an interior surface of the flat portion 608 of the base 606 and second mounting flange 628 extending longitudinally inwardly from a sidewall 630 of the base 606. Each of the first and second mounting flanges 626 and 628, respectively, preferably comprise a pair of vertically disposed looped flanges having a central vertical aperture for receiving opposite ends of a part between the looped flanges and to retain the same by a pin or other protrusion.

The rearward portion of the container arm 602 includes a rearwardly-extending flange 634 extending angularly rearwardly of the container housing 614 and further including a first protrusion 636 extending upwardly from a top surface of the flange 634 and second protrusion 638 extending downwardly from a bottom surface of the flange 634. The flange 634 further includes a lateral flange 640 located rearwardly of a vertical axis defined by the protrusions 636 and 638 and comprising a pair of horizontally extending flanges 642 and 644, each having a central vertical aperture 646 and 648 at their respective distal ends 650 and 652.

The locking/ratcheting mechanism 624 comprises a cylinder 654 having an outwardly-biased piston 656 extending axially therefrom. The cylinder 654 includes a longitudinal section 658 having a proximal end 660 and distal end 662.

The proximal end 660 of the cylinder 654 has a pin 664 mounted to an upper surface of the proximal end 660 of the cylinder 654 which includes a depending portion 666 downwardly biased by a circumferential band 667 which extends around the proximal end 660 of the cylinder 654 over the pin 664 and applies a downward pressure thereto to downwardly bias the depending portion 666. The distal end 662 includes a first protrusion 668 extending upwardly from the distal end 662 and a second protrusion 670 extending downwardly from the distal end 662.

The piston 656 of the locking/ratcheting mechanism 624 is biased outwardly in an axial direction by an internal spring within the cylinder 654 and includes at a distal end 672, a first protrusion 674 extending upwardly from the distal end 672 and a second protrusion 676 extending downwardly from the distal end 672.

In assembly, the protrusions 636 and 638 of the flange 634 are lockingly engaged within the first mounting flanges 626, 627 to mount the container arm 602 for pivotable movement about the vertical axis defined by the protrusions 636 and 638. The protrusions 668 and 670 of the distal end 662 of the cylinder 654 are lockingly engaged within the second mounting flanges 628, 629, extending inwardly from the sidewall 630 of the housing 600 such that the cylinder 654 and the piston 656 extend longitudinally inwardly toward the container arm 602. The protrusions 674 and 676 of the distal end 672 of the piston 656 are lockingly engaged within the vertical apertures 646 and 648 within the horizontal flanges 642 and 644 of the housing 634. Due to the rearward location of the connection point of the piston 656 to the axial flange 640 of the housing 634 with respect to the pivotal mounting of the housing 634 to the housing 600, the lateral flange 640 serves as a lever arm for rotation of the container arm 602 about the vertical axis defined by the protrusions 636 and 638 such that inward or outward axial movement of the piston 656 produces a corresponding inward or outward rotation of the container arm 602 about the vertical axis defined by the protrusions 636 and 638.

The locking/ratcheting mechanism 624 is shown in greater detail in FIG. 19. Turning to FIG. 19, the upper surface of the cylinder 654 includes a transverse slot 678 which exposes upwardly-extending longitudinal walls 680 and 682 and an island 684 between which is defined a slot 686. The longitudinal wall 680 includes a wide portion 688 which tapers into a narrow portion 690. The longitudinal wall 682 comprises a straight axially-extending wall which extends substantially parallel to wall 680. Walls 680 and 682 terminate at the distal end 672 of the piston 656 into a heart-shaped wall 692. The island 684 comprises a ratchet 694 which extends into a narrow neck 696 and terminates at a heart-shaped block 698. The ratchet 694 is an upwardly-extending block having a leading edge 700, several detents 702 and a trailing edge 704. The heart-shaped block includes a large lobe 706, a small lobe 708 and a valley 710 disposed therebetween. In assembly, the depending portion 666 of the pin 664 is disposed within the slot 686 between the lobes 706 and 708 in the valley 710 when the container arm 602 is in a closed position.

In operation, to position the container arm 602 in the extended position as shown in FIG. 17, a small normal force must be applied to the front face 612 of the container arm 602. As this inward force is applied, the piston 656 attached to the axial flange 640 on the container housing 602 will be displaced slightly inwardly by the inward normal force applied to the container arm 602. This inward movement of the piston 656 causes the depending portion 666 of the pin 664 to be forced out of the valley 710 and against the small lobe 708. As the normal force is released, the outwardly axially-biased piston 656 will be driven outwardly and axially by the internal spring within the cylinder 654. This outward movement of the piston 656 will cause the depending portion 666 of the pin 664 to slide around the small lobe 708 and along the slot 686 beyond the neck portion 696 and the ratchet 694 until the piston 656 is fully extended and pivotably rotates the container arm 602 outwardly into the position shown in FIG. 17.

The container arm 602 can be discretely adjusted by applying an additional normal force to the front face 612 of the container arm 602 urging the depending portion 666 of the pin 664 against the leading edge 700 of the ratchet 694 which is curved to deflect the pin 664 laterally towards the widened portion 688 of the longitudinal wall 680. As the normal force is released, the outwardly axially-biased piston 656 will be driven outwardly and axially by the internal spring within the cylinder 654. This outward movement of the piston 656 in conjunction with the tendency of the pin 664 to return to an undeflected axial state causes the depending portion 666 of the pin 664 to lodge within a detent 702 on the ratchet 694 and provide an inward adjustment of the container arm 602. Further inward adjustments of the container arm 602 can be achieved by applying addition normal forces to the front face 612 of the container arm 602 to lodge the depending portion 666 of the pin 664 within a successive detent 702.

In order to return the container arm 602 into the retracted position as shown in FIG. 16, an inward normal force must be applied to the front face 612 of the container arm 602. As this inward normal force is applied, the piston 656 will be urged into the cylinder 654 such that the depending portion 666 of pin 664 will slide around the trailing edge 704 of the ratchet 694 and along the narrow longitudinal slot 686 between the wall 680 and the neck portion 696 toward the proximal end 660 of the cylinder 654. As the depending portion 666 of the pin 664 reaches the heart-shaped block 698, it is urged counterclockwise into the slot between the heart-shaped block 698 and the heart-shaped wall 692 and around the large lobe 706. At this point the inward normal force applied to the front face 612 of the container arm 602 can be released. The internal spring within the cylinder 654 then urges the piston 656 outwardly. However, the outward travel of the piston 656 is limited by the travel of the depending portion 666 of the pin 664 which is then forced into the valley 710 between the lobes 706 and 708 and is thus returned to the retracted position as shown in FIG. 16.

Figure 20:
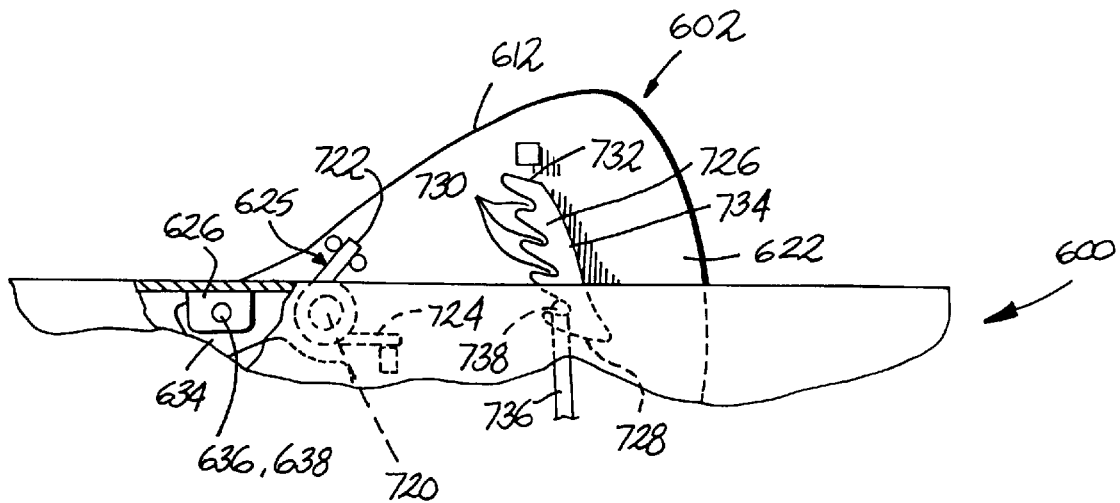
FIG. 20 is a fragmentary bottom view of the container holder taken along lines 20—20 of FIG. 17.

FIG. 20 illustrates an alternative embodiment to the locking mechanism shown in FIGS. 18 and 19. Turning to the bottom view of FIG. 20, the pivotable mounting of the container arm 602 is achieved as before by lockingly engaging the protrusions 636 and 638 of the rear container housing 634 within the first mounting flange 626. The container arm 602 is outwardly biased by an arm spring 625 which comprises a coil 720 and a first arm 722 mounted to the underside of the platform 622 of the container arm 602 and a second arm 724 mounted to the interior of the housing 600. The underside of the platform 622 also includes a downwardly-extending ratchet 726 defined by a leading edge 728, several inwardly-extending angular detents 730, a trailing edge 732 and a backside 734. A laterally-extending pin 736 is mounted to the interior of the housing 600 and includes an upwardly-extending portion 738. When the container arm 602 is in the closed position as shown in FIG. 16, the upwardly-extending portion 738 of the pin 736 is maintained in the outwardmost detent 730 of the ratchet 726.

In operation, to position the container arm 602 in the open position as shown in FIG. 17, a small normal force must be applied to the front face 612 of the container arm 602. As this inward force is applied, the upwardly-extending portion 738 of the pin 736 will be urged out of the outwardmost detent 730 and against the trailing edge 732. As the normal force is released, the arm spring 625 outwardly biases the container arm 602. This outward radial movement of the container arm 602 will cause the upwardly-extending portion 738 of the pin 736 to slide around the trailing edge 732 and along the backside 734 of the ratchet until the arm spring 625 has fully pivoted the container arm 602 outwardly into the position shown in FIGS. 17 and 20. When the container arm 602 is in the opened position, the upwardly-extending arm 602 of the pin 736 does not contact the ratchet 726.

The container arm 602 can then be discretely adjusted by applying an additional normal force to the front face 612 of the container arm 602 urging the upwardly-extending portion 738 of the pin 736 around the leading edge 728 of the ratchet 726 which is curved to deflect the pin 736 laterally into the first detent 730 of the ratchet 726. As the normal force is released, the arm spring 625 outwardly biases the container arm 602 which causes the upwardly-extending portion 738 of the pin 736 to lodge within the first detent 730 on the ratchet 726 and provide an inward adjustment of the container arm 602. Further inward adjustments of the container arm 602 can be obtained by applying addition normal forces to the front face 612 of the container arm 602 to lodge the upwardly-extending portion 738 of the pin 736 within the next successive detent 730.

In order to return the container arm 602 into the retracted position as shown in FIG. 16, an inward normal force must be applied to the front face 612 of the container arm 602. As this inward normal force is applied, the container arm 602 is urged within the housing 600 such that the upwardly-extending portion 738 of the pin 736 slides into the outwardmost detent 730 on the ratchet 726. At this point, the inward normal force applied to the front face 612 of the container arm 602 can be released to lodge the upwardly-extending portion 738 of the pin 736 into the outwardmost detent 730 to maintain the container arm 602 in the closed position.

Figure 21:
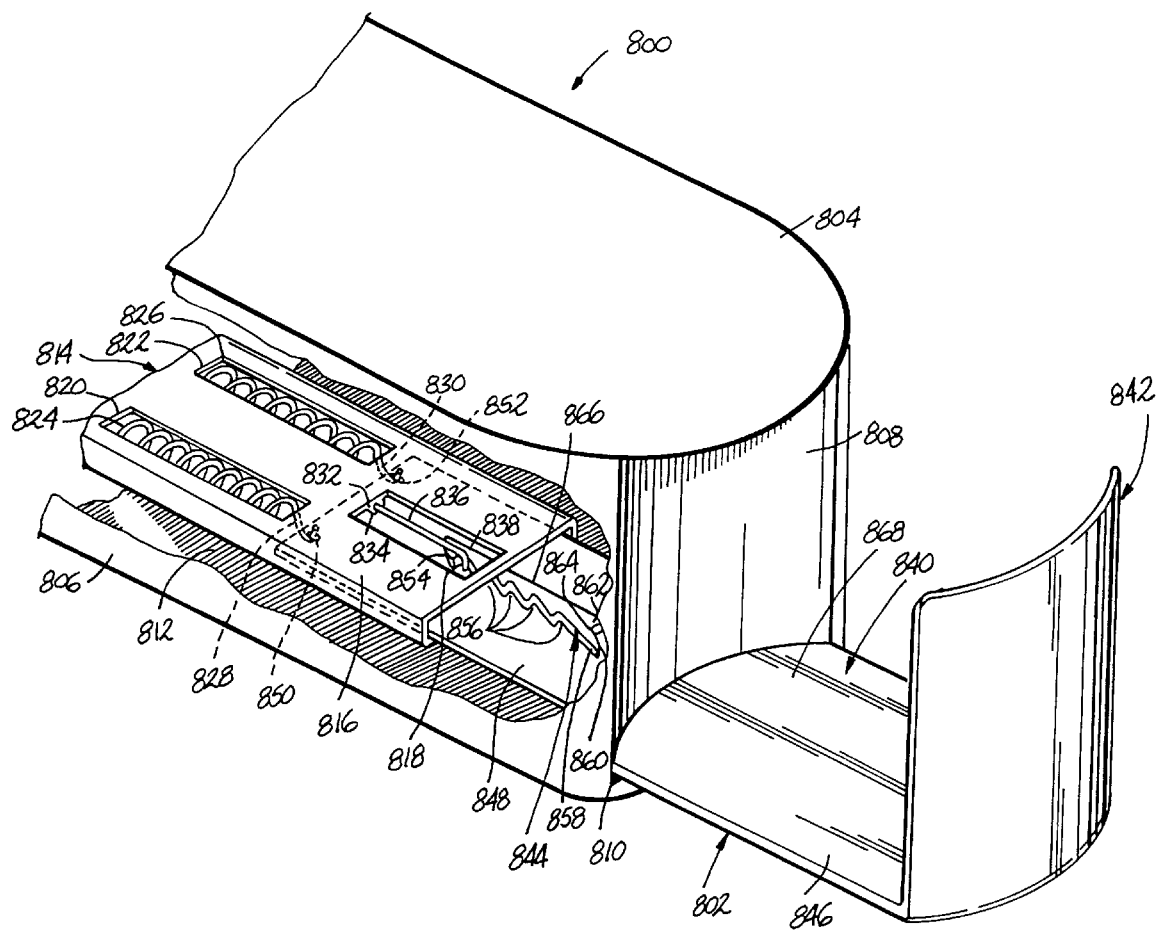
FIG. 21 is a perspective view of a fifth alternative embodiment of the container holder according to the invention in an opened position.

FIG. 21 illustrates a fifth alternative embodiment of a housing 800 into which a container holder 802 is slidably mounted for movement from a closed position (not shown) to the open position shown in FIG. 21. The housing 800 can be mounted to any suitable portion within a vehicle but the housing 800 of this embodiment will typically comprise an armrest integrally formed with or mounted to a console located between the driver and passenger front seats in a vehicle.

The housing 800 comprises an armrest 804 of a conventional shape and styling used in vehicles and a base 806 having a front concave indentation 808 which includes a slit-like recess 810 into which the container holder 802 is slidably mounted for movement from a stored position where it is disposed directly adjacent the housing 800 to a use position where it is slidably moved beyond the concave indentation 808 of the base 806 as shown in FIG. 21. An interior floor 812 of the base 806 includes a slider bracket 814 mounted thereto. The slider bracket 814 comprises a flat, rectangular housing 816 of rectangular cross-section having a much greater width than height and provided with rectangular apertures 818, 820 and 822. The aperture 818 is disposed along the top surface of the housing 816 in a forward central portion therein while the apertures 820 and 822 are disposed rearwardly of the aperture 818 adjacent opposing longitudinal edges of the housing 816. The housing 816 includes a hollow, central core adapted to receive a portion of the container holder 802. Coil springs 824 and 826 are mounted to a rearward portion of the hollow central core of the housing 816 and each includes a forward end 828 and 830, respectively. A rearward edge 832 of the aperture 818 includes a downwardly-extending flange 834 provided with a forwardly-extending pin 836. The pin 836 has a downwardly-depending portion 838 at its forward end. It should be noted that the slider bracket 814 is sufficiently flat to provide a large storage area within the base 806 which may be accessed by a user through an upwardly-pivotable mounting of the armrest portion 804.

The container holder 802 comprises a flat rectangular tray 840, a forward flange 842 and a ratchet 844. The tray 840 comprises a flat rectangular cup platform 846 adapted to be received within the slit-like recess 810 in the base 806 and a rearwardly-extending flange 848 adapted to be received within the slider bracket 814. The flange 848 is provided with a pair of mounting apertures 850 and 852. The forward flange 842 extends upwardly from a forward end of the tray 840 and comprises an outwardly curved convex shell. The ratchet 844 extends upwardly from the flange 848 of the tray 840 and comprises a leading edge 854, several inward angular detents 856, a trailing edge 858 and first and second flanges 860 and 862, respectively. The leading edge 854 is an arcuately curved portion which leads into the first detent 856. The detents 856 are longitudinally disposed along the ratchet 844 for discrete adjustments of the container holder 802. The trailing edge 858 is an angular straight portion which provides an outer surface for the first flange 860. The first and second flanges 860 and 862, respectively, are angularly-disposed elliptical elements having a valley 864 disposed therebetween. The first flange 860 extends longitudinally and angularly beyond, and is of a larger size than, the second flange 862. The ratchet 844 further includes a rearward side 866 comprising a longitudinal straight edge connecting the second flange 862 with the leading edge 854.

In assembly, the platform 846 of the container holder 802 is slidably inserted within the slit-like recess 810 in the housing 800 and the flange 848 is slidably inserted within the slider bracket 814 and the forward ends 828 and 830 of the coil springs 824 and 826, respectively, are mounted to the apertures 850 and 852, respectively, of the flange 848. The coil springs 824 and 826 bias the tray 840 outwardly of the container holder 802 of the slit-like recess 810 in the housing 800 such that the upwardly-extending flange 842 of the container holder 802 and the concave indentation 808 of the housing 800 define a container-receiving area 868 therebetween. The downwardly-depending portion 838 of the pin 836 may be selectively engaged within the detents 856 of the ratchet 844 to vary the useful size of the container-receiving area 868. When the container arm 802 is in a closed position wherein the upwardly-extending flange 842 of the container holder 802 is directly adjacent the concave indentation 808 of the housing 800, the downwardly-extending portion 838 of the pin 836 is maintained within the valley 864 between the first and second flanges 860 and 862, respectively.

In operation, to position the container holder 802 in the open position as shown in FIG. 21, a small normal force must be applied to the upwardly-extending flange 842 of the container holder 802. As this inward force is applied, the upwardly-extending portion 838 of the pin 836 will be urged out of the valley 864 and around the second flange 862. As the normal force is released, the coil springs 824 and 826 outwardly bias the container holder 802. This outward longitudinal movement of the container arm 602 causes the downwardly-extending portion 838 of the pin 836 to slide along the rearward side 866 of the ratchet 844 until the springs 824 and 826 have fully extended the container holder into the position shown in FIG. 21 which defines the largest possible container-receiving area 868. When the container holder 802 is in the open position, the downwardly-extending portion 838 of the pin 836 does not contact the ratchet 844. The tray 840 can include an upwardly-extending stop (not shown) to prevent the container holder 802 from being pulled completely out of the housing 800 and to prevent overextension of the springs 824 and 826 which could damage the assembly.

The container holder 802 can then be discretely adjusted by applying an additional inward normal force to the upwardly-extending flange 842 of the container holder 802 urging the downwardly-extending portion 838 of the pin 836 around the leading edge 854 of the ratchet 844 which is curved to deflect the pin 836 laterally into the first detent 856 of the ratchet 844. As the normal force is released, the springs 824 and 826 outwardly bias the container holder 802 which causes the downwardly-extending portion 838 of the pin 836 to lodge within the first detent 856 on the ratchet 844 and provide an inward adjustment of the container holder 802. Further inward adjustments of the container holder 802 can be obtained by applying additional inward normal forces to the upwardly-extending flange 842 of the container holder 802 to lodge the downwardly-extending portion 838 of the pin 836 within the next successive detent 856.

In order to return the container holder 802 into a stored position, an inward normal force must be applied to the upwardly-extending flange 842 of the container holder 802. As this inward normal force is applied, the container holder 802 is urged within the slit-like recess 810 of the housing 800 such that the downwardly-extending portion 838 of the pin 836 slides along the trailing edge 858 and around the first flange 860 of the ratchet 844. At this point the inward normal force applied to the upwardly-extending flange 842 of the container holder 802 is released. The outward bias of the springs 824 and 826 causes the downwardly-extending portion 838 of the pin 836 to slide along the inner surface of the first flange 860 and lodge within the valley 864 to maintain the container holder 802 in the closed position.

While particular embodiments of the invention have been shown, it will be understood, of course, that the invention is not limited thereto since modifications may be made by those skilled in the art, particularly in light of the foregoing teachings. Reasonable variation and modification are possible within the scope of the disclosure of the invention without departing from the spirit of the invention.

The embodiments for which an exclusive property or privilege is claimed are defined as follows:

1. A container holder for supporting a container and comprising:

a housing having a front and a back;

a drawer movably mounted within the housing between a stored position within the housing and a use position where the drawer extends beyond the front of the housing;

first and second arms movably mounted to the drawer in complementary relationship for interrelated movement between a retracted position and an extended position, the first and second arms having a shape to define a container receiving area of varying size therebetween;

a spring to bias at least one of the first and second arms outwardly of the drawer;

the first and second arms are structurally linked together to move in complementary fashion to each other;

a first positioning member mounted to one of the arms and the drawer, and a second positioning member mounted to the other of the one of the arms and the drawer and releasably engagable with the first positioning member to releasably retain the arms in a plurality of adjusted positions with respect to the drawer so that the container receiving area can be releasably set in different sizes to accommodate different size containers.

2. The container holder according to claim 1 wherein the first positioning member is a pin and the second positioning member comprises multiple teeth between which the pin is received to discretely adjust the position of the arms.

3. The container holder according to claim 2 wherein the first positioning member is mounted to the drawer and the second positioning member is formed integrally with one of the first and second arms.

4. A container holder according to claim 1 wherein the first positioning member is a pawl and the second positioning member is a ratchet having multiple detents in which the pawl is received to discretely adjust the position of the arms.

5. A container holder according to claim 1 wherein each of the first and second arms has a pivot pin and is pivotally mounted to the drawer through the pivot pin for rotation about a vertical axis.

6. A container holder according to claim 5 and comprising a container platform for supporting the base of a container received within the container receiving area.

7. A container holder according to claim 5 wherein the drawer further comprises a container platform for supporting the base of a container received within the container receiving area.

8. A container holder according to claim 1 wherein the spring comprises a first spring arm and a second spring arm, the first spring arm is mounted to the drawer and the second spring arm is mounted to one of the first and second arms.

9. A container holder according to claim 1 wherein the first and second arms are arcuate in shape to define a portion of the container receiving area.

10. A container holder according to claim 1 and further comprising a release lever for the first and second positioning members to permit movement of the first and second arms from the retracted position to the extended position without interference between the first and second positioning members, whereby the arms can move unimpeded to the extended position from the retracted position.

11. A container holder according to claim 10 wherein the housing has a sidewall which interfaces with one of the arms to move the arms to the retracted position when the drawer is in the stored position, whereby the arm will automatically move to the extended position when the drawer is moved to the use position.

12. A container holder according to claim 1 wherein the structural linkage between the first and second arms comprises meshing gear portions on each of the first and second arms.

* * * * *

UNITED STATES PATENT AND TRADEMARK OFFICE
CERTIFICATE OF CORRECTION

PATENT NO.: 5,897,089

DATED: April 27, 1999

INVENTORS: LANCASTER ET AL.

It is certified that error appears in the above-identified patent and that said Letters Patent are hereby corrected as shown below:

On the title page;

[73] Assignee: The Leslie Metal Arts Co., Inc Grand Rapids, Mi.

Signed and Sealed this

Sixteenth Day of November, 1999

Attest:

Q. TODD DICKINSON

*Attesting Officer*   *Acting Commissioner of Patents and Trademarks*